(12) United States Patent
Kil et al.

(10) Patent No.: US 9,871,549 B2
(45) Date of Patent: Jan. 16, 2018

(54) ELECTRONIC DEVICE, AND DEVICE AND METHOD FOR PROTECTING THE ELECTRONIC DEVICE

(71) Applicant: Samsung Electronics Co., Ltd., Gyeonggi-do (KR)

(72) Inventors: Kwang-Min Kil, Gyeonggi-do (KR); Jae-Hoon Choi, Gyeongsangbuk-do (KR); Li-Yeon Kang, Gyeonggi-do (KR); Jin-Keun Park, Gyeongsangbuk-do (KR); Sang-Soo Lee, Seoul (KR); Min-Jong Lim, Gyeonggi-do (KR); Dong-Sub Kim, Gyeonggi-do (KR); Sang-Kyu Lee, Gyeongsangbuk-do (KR); Jong-Chul Choi, Gyeonggi-do (KR); Chang-Ryong Heo, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/236,896

(22) Filed: Aug. 15, 2016

(65) Prior Publication Data

US 2017/0047960 A1   Feb. 16, 2017

(30) Foreign Application Priority Data

Aug. 13, 2015   (KR) .................. 10-2015-0114543

(51) Int. Cl.
*H04W 4/00* (2009.01)
*H04B 1/3888* (2015.01)

(52) U.S. Cl.
CPC .......... *H04B 1/3888* (2013.01); *H04W 4/008* (2013.01)

(58) Field of Classification Search
CPC .. H04B 1/3888; H04M 1/575; H04M 1/0245; H04M 1/0266; H04M 1/72569; H04M 2250/12; H04W 4/008
See application file for complete search history.

(56) References Cited

U.S. PATENT DOCUMENTS

| | | | |
|---|---|---|---|
| 8,967,376 | B1 | 3/2015 | Lewbel |
| 2015/0057050 | A1* | 2/2015 | Park .................... H04M 1/0243 455/566 |
| 2016/0344440 | A1* | 11/2016 | Peterson ............. H04B 1/3888 |

FOREIGN PATENT DOCUMENTS

| | | |
|---|---|---|
| JP | 2007-158694 | 6/2007 |
| JP | 5 446 838 | 3/2014 |
| KR | 10-2015-0018730 | 2/2015 |

* cited by examiner

*Primary Examiner* — Thanh Le
(74) *Attorney, Agent, or Firm* — The Farrell Law Firm, P.C.

(57) ABSTRACT

An electronic device, a protection device, and a method for protecting the electronic device with the protection device is provided. The electronic device includes a sensor module configured to detect a motion state of the electronic device when a cover is connected to the electronic device, and a processor configured to control an actuator of the cover based on the detected motion state of the electronic device.

18 Claims, 21 Drawing Sheets

ELECTRONIC DEVICE, AND DEVICE AND METHOD FOR PROTECTING THE ELECTRONIC DEVICE

PRIORITY

This application claims priority under 35 U.S.C. §119(a) to a Korean Patent Application filed in the Korean Intellectual Property Office on Aug. 13, 2015, and assigned Serial No. 10-2015-0114543, the entire disclosure of which is incorporated herein by reference.

BACKGROUND

1. Field of the Disclosure

The present disclosure relates generally to an accessory mounted on a user terminal device, such as a smartphone, a tablet personal computer (PC), etc. and, more particularly, to a method for protecting a terminal from a shock and providing a basic accessory function.

2. Description of the Related Art

Existing mobile accessories have been used merely for pure accessory purposes, such as decoration, device protection, cradling, etc. For example, a flip-cover accessory has been used with various cover colors and designs, or with various transparent window positions.

There are some essential accessories which are often purchased when people buy smartphones. Such essential accessories include a cover case and a window protection film for protecting an expensive device. When a user drops a smartphone, breakage of the device may be alleviated with the cover case and the window protection film.

Thus, in a conventional electronic device (e.g., a smartphone), a protective cover may physically protect a display provided on a front surface of the electronic device when coupled to a rear surface of the electronic device.

However, when the electronic device receives a shock from being dropped with the cover open, a display region of the electronic device is not protected, causing damage to the display glass or liquid crystals. To protect the display region, the display region needs to be covered with a separate protection film or cover, degrading usability.

SUMMARY

The present disclosure has been made to address at least the above-mentioned problems and/or disadvantages, and to provide at least the advantages described below.

Accordingly, an aspect of the present disclosure is to provide a function of controlling cover opening and closing to protect a display region of an electronic device using an accessory cover of the electronic device when the electronic device is dropped.

In accordance with an aspect of the present disclosure, an electronic device is provided. The electronic device includes a sensor module configured to detect a motion state of the electronic device when a cover is connected to the electronic device, and a processor configured to control an actuator of the cover based on the detected motion state of the electronic device.

In accordance with another aspect of the present disclosure, a protection device for protecting an electronic device is provided. The protection device includes a connection portion connected with the electronic device, an actuator configured to actuate the protection device, and a controller configured to control the actuator based on a control signal obtained from the connected electronic device through the connection portion.

In accordance with another aspect of the present disclosure, a method for protecting an electronic device is provided. The method includes detecting connection of a cover to the electronic device, detecting a motion state of the electronic device upon connection of the cover, and controlling an actuator of the connected cover based on the detected motion state.

BRIEF DESCRIPTION OF THE DRAWINGS

The above and other aspects, features, and advantages of the present disclosure will be more apparent from the following description taken in conjunction with the accompanying drawings in which.

DETAILED DESCRIPTION OF EMBODIMENTS OF THE PRESENT DISCLOSURE

Figure 1:
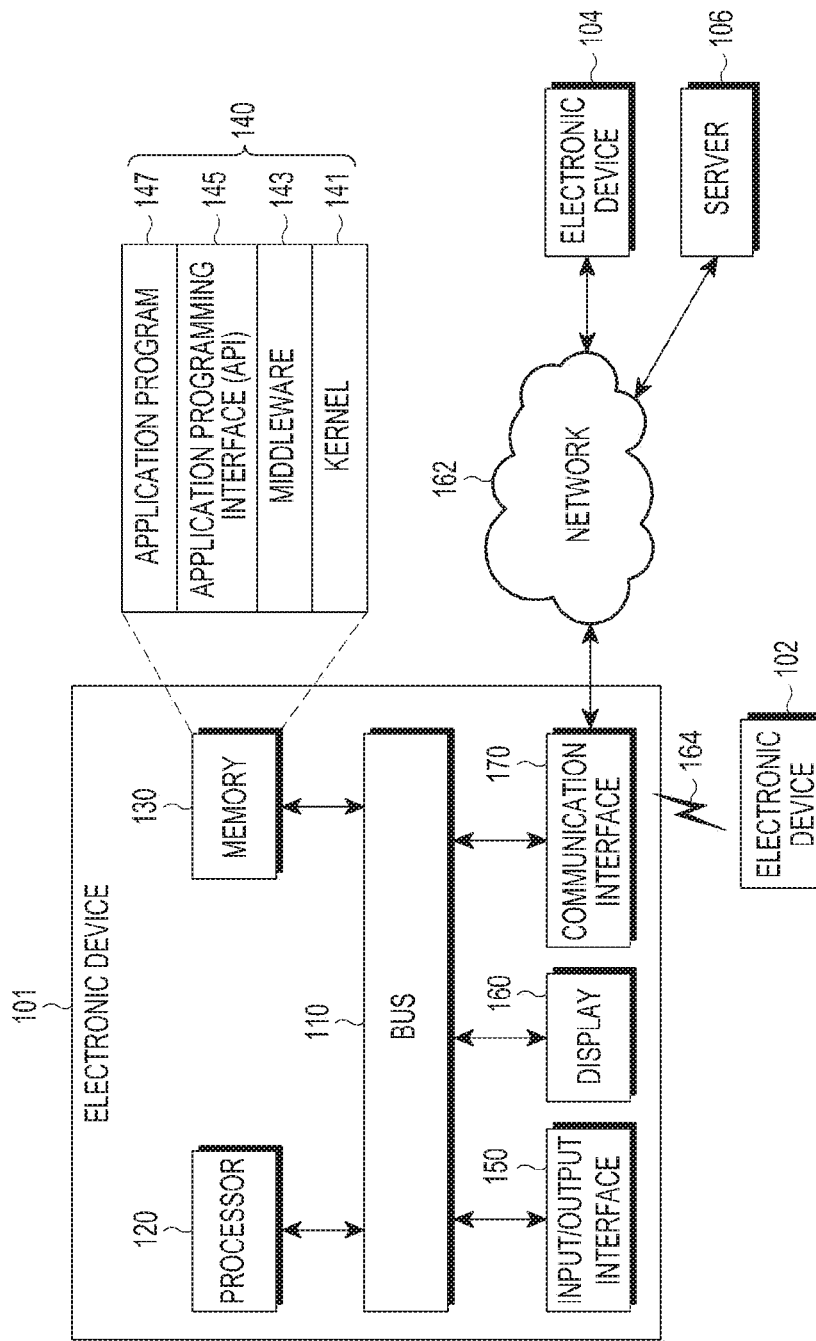
FIG. 1 is a block diagram of a configuration of a network environment, according to an embodiment of the present disclosure.

Hereinafter, various embodiments of the present disclosure will be disclosed with reference to the accompanying drawings, in which like reference numerals refer to like elements. However, the embodiments described herein are not intended to limit the present disclosure to particular embodiments, and the present disclosure should be construed as including various modifications, equivalents, and/or alternatives of the embodiments described herein.

In the present disclosure, expressions such as "having," "may have," "comprising," and "may comprise" indicate the existence of a corresponding characteristic (such as a numerical value, function, operation, or component) and do not exclude the existence of an additional characteristic.

In the present disclosure, expressions such as "A or B," "at least one of A or/and B," and "one or more of A or/and B" may include all possible combinations of items listed together. For example, "A or B," "at least one of A and B," or "one or more of A or B" may indicate (1) including A, (2) including B, or (3) including both A and B.

Expressions such as "first," "second," "primarily," "secondary," etc., used herein may represent various elements regardless of order and/or importance and do not limit corresponding elements. The expressions may be used for distinguishing one element from another element. For example, a first user device and a second user device may represent different user devices regardless of order or importance. For example, a first element may be referred to as a second element without deviating from the scope of the present disclosure, and similarly, a second element may be referred to as a first element.

When an element (such as a first element) is described as being operatively or communicatively "coupled" to or "connected" to another element (such as a second element), the first element can be directly connected to the second element or can be connected to the second element through a third element. However, when an element (such as a first element) is described as being "directly connected" or "directly coupled" to another element (such as a second element), there is no intermediate element (such as a third element) between the first element and the second element.

The expression "configured (or set) to" used in the present disclosure may be used interchangeably with, for example, "suitable for," "having the capacity to," "designed to," "adapted to," "made to," or "capable of" according to the situation. The term "configured (or set) to" does not always mean only "specifically designed to" by hardware. Alternatively, in some situations, the expression "apparatus configured to" may mean that the apparatus "can" operate together with another apparatus or component. For example, the phrase "a processor configured (or set) to perform A, B, and C" may refer to a generic-purpose processor (such as a CPU or an application processor) that can perform a corresponding operation by executing at least one software program stored at an exclusive processor (such as an embedded processor) for performing a corresponding operation or at a memory device.

Terms defined in the present disclosure are used only for describing a specific embodiment and are not intended to limit the scope of other embodiments. When a singular form is used herein, it should be understood to include plural forms as well, unless the context dictates otherwise. All terms, including technical and scientific terms, used herein, have the same meaning as commonly understood by a person of ordinary skill in the art. Additionally, terms defined in a dictionary should be interpreted to have meanings consistent with their meanings in the context of the related technology and are not to be interpreted in as an ideal or excessively formal manner, unless explicitly so defined. In some cases, terms defined in the present disclosure should not be interpreted to exclude the embodiments of the present disclosure.

An electronic device, according to various embodiments of the present disclosure may be a device including a communication function. For example, the electronic device may include at least one of a smart phone, a tablet personal computer (PC), a mobile phone, a video phone, an electronic book (e-book) reader, a desktop PC, a laptop PC, a netbook computer, a workstation, a server, a personal digital assistant (PDA), a portable multimedia player (PMP), an MP3 player, mobile medical equipment, a camera, and a wearable device. The wearable device may include at least one of an accessory type (e.g., a watch, a ring, a bracelet, an anklet, a necklace, glasses, contact lenses, or a head-mounted-device (HMD)), a fabric or clothing-integrated type (e.g., electronic clothing), a body-attached type (e.g., a skin pad or tattoo), and a body-implanted type (e.g., an implantable circuit).

According to some embodiments of the present disclosure, the electronic device may be a smart home appliance. The home appliance may include at least one of a Television (TV), a Digital Versatile Disk (DVD) player, audio equipment, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, and an electronic frame.

According to another embodiment of the present disclosure, the electronic device may include at least one of medical equipment (e.g., a portable medical measurement system, such as a blood sugar measurement device, a heartbeat measurement device, a blood pressure measurement device, or a body temperature measurement device, a magnetic resonance angiography (MRA) device, a magnetic resonance imaging (MRI) device, computed tomography (CT) device, an imaging device, or an ultrasonic device), a navigation system, a global navigation satellite system (GNSS), an event data recorder (EDR), a flight data recorder (FDR), a vehicle infotainment device, electronic equipment for ships (e.g., a navigation system and gyro compass), avionics, a security device, a vehicle head unit, an industrial or home robot, an automatic teller machine (ATM), a point of sales (POS) device, Internet of Things (IoT) device (e.g., an electric bulb, a sensor, an electricity or gas meter, a sprinkler device, a fire alarm device, a thermostat, a streetlight, a toaster, an exercise machine, a hot-water tank, a heater, a boiler, etc.).

According to some embodiments of the present disclosure, the electronic device may include a part of a furniture or building/structure, an electronic board, an electronic signature receiving device, a projector, and a measuring instrument (e.g., a water, electricity, gas, or electric wave measuring device).

The electronic device according to various embodiments of the present disclosure may be one of the above-listed devices or a combination thereof. The electronic device may be a flexible device. It will be obvious to those of ordinary skill in the art that the electronic device of the present disclosure is not limited to the above-listed devices and may include new electronic devices according to technological developments.

Hereinafter, an electronic device according to various embodiments of the present disclosure will be described with reference to the accompanying drawings. As used herein, the term "user" may refer to a person who uses the electronic device or a device using the electronic device (e.g., an artificial intelligence electronic device).

FIG. 1 is a block diagram of a configuration of a network environment, according to an embodiment of the present disclosure.

Referring to FIG. 1, an electronic device 101 in a network environment 100 is provided. The electronic device 101 includes at least one of a bus 110, a processor 120, a memory 130, an I/O interface 150, a display 160, and a communication module 170. The electronic device 101 may omit at least one of the foregoing elements or may further include other elements.

The bus 110 is a circuit for interconnecting the elements 110 through 170 described above and for allowing communication (e.g., a control message and/or data) between the elements 110 through 170.

The processor 120 includes one or more of a Central Processing Unit (CPU), an Application Processor (AP), and a Communication Processor (CP). The processor 120 performs operations or data processing for control and/or communication of at least one other elements of the electronic device 101.

The memory 130 may include a volatile and/or nonvolatile memory. The memory 130 stores commands or data associated with at least one other element of the electronic device 101. The memory 130 stores software and/or a program 140. The program 140 includes a kernel 141, middleware 143, an application programming interface (API) 145, and/or an application program 147. At least some of the kernel 141, the middleware 143, and the API 145 may be referred to as an operating system (OS).

The kernel 141 controls or manages system resources (e.g., the bus 110, the processor 120, or the memory 130) used to execute an operation or a function implemented in other programs (e.g., the middleware 143, the API 145, or the application program 147). The kernel 141 provides an interface through which the middleware 143, the API 145, or the application program 147 accesses separate components of the electronic device 101 to control or manage the system resources.

The middleware 143 operates as an intermediary for allowing the API 145 or the application program 147 to exchange data in communication with the kernel 141. The middleware 143 processes one or more task requests received from the application program 147. For example, the middleware 143 may give priorities for using a system resource (e.g., the bus 110, the processor 120, or the memory 130) of the electronic device 101 to at least one application of the application program 147. The middleware 143 performs control (e.g., scheduling or load balancing) with respect to the one or more task requests by processing the task requests according to the given priorities.

The API 145 is an interface used for the application program 147 to control a function provided by the kernel 141 or the middleware 143, and may include at least one interface or function (e.g., a command) for file control, window control, image processing or character control.

The I/O interface 150 serves as an interface for delivering a command or data input from a user or another external device to other elements of the electronic device 101. The I/O interface 150 also outputs a command or data received from other elements of the electronic device 101 to a user or another external device.

The display 160 may include a liquid crystal display (LCD), a light emitting diode (LED) display, an organic light emitting diode (OLED) display, a microelectromechanical system (MEMS) display, or an electronic paper display. The display 160 displays various contents (e.g., a text, an image, video, an icon, or a symbol) to users. The display 160 may include a touch screen, and receive a touch, a gesture, proximity, or a hovering input by using an electronic pen or a part of a body of a user.

The display 160 may have the same meaning as a touch screen.

The communication module 170 establishes communication between the electronic device 101 and an external device, such as a first external electronic device 102, a second external electronic device 104, or a server 106. The communication module 170 is connected to a network 162 through wireless or wired communication to communicate with the second external electronic device 104 or the server 106.

The wireless communication may use, as a cellular communication protocol at least one of long term evolution (LTE), LTE-advanced (LTE-A), code division multiple access (CDMA), wideband CDMA (WCDMA), a universal mobile telecommunication system (UMTS), wireless broadband (WiBro), or global system for mobile communications (GSM)). Wireless communication includes short-range communication 164.

The short-range communication 164 may include at least one of WiFi, Bluetooth (BT), near field communication (NFC), and global navigation satellite system (GNSS). The GNSS may include at least one of a global positioning system (GPS), a global navigation satellite system (Glonass), a Beidou navigation satellite system ("Beidou"), and Galileo, the European global satellite-based navigation system. The term "GPS" may be used interchangeably with "GNSS".

The wired communication may include at least one of a universal serial bus (USB), a high definition multimedia interface (HDMI), a recommended standard (RS)-2032, and a plain old telephone service (POTS). The network 162 is a telecommunications network, for example, at least one of a computer network (e.g., a local area network (LAN) or a wide area network (WAN)), the Internet, and a telephone network.

Each of the first external electronic device 102 and the second external electronic device 104 may be a device of the same type as or a different type than the electronic device 101.

The server 106 includes a group of one or more servers.

According to an embodiment of the present disclosure, all or some of operations performed in the electronic device 101 may be performed in another electronic device or a plurality of electronic devices, such as the external electronic devices 102 and 104 or the server 106. In this case, when the electronic device 101 has to perform a function or a service automatically or by request, the electronic device 101 may request the external electronic device 102 or 104 or the server 106 to perform at least some functions associated with the function or the service, instead of or in addition to executing the function or the service. The external electronic device 102 or 104 or the server 106 performs the requested function or an additional function and delivers the result to the electronic device 101. The electronic device 101 provides the received result or provides the requested function or service by processing the received result. To this end cloud computing, distributed computing, or client-server computing may be used.

Figure 2:
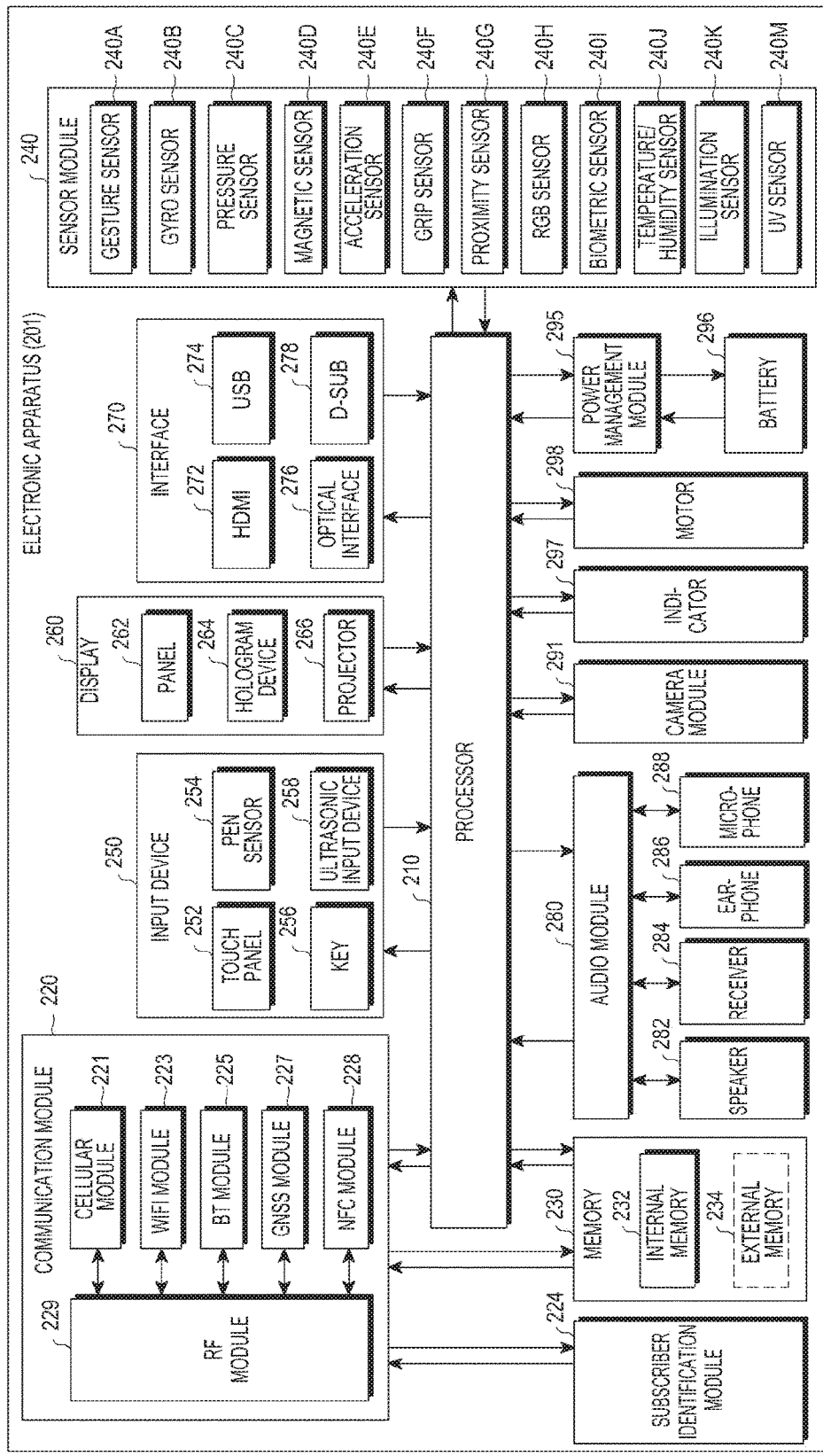
FIG. 2 is a block diagram of a hardware configuration of an electronic device, according to an embodiment of the present disclosure.

FIG. 2 is a block diagram of a hardware configuration of an electronic device, according to an embodiment of the present disclosure.

Referring to FIG. 2, an electronic device 201 is provided. The electronic device 201 may include the entire electronic device 101 illustrated in FIG. 1 or a part of the electronic device 101 illustrated in FIG. 1. The electronic device 201 includes one or more application processors (APs) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 controls multiple hardware or software components connected to the processor 210 by driving an operating system (OS) or an application program, and performs processing and operations with respect to various data including multimedia data. The processor 210 may be implemented with a system on chip (SoC). The processor 210 may further include a graphic processing unit (GPU) and/or an image signal processor. The processor 210 may include at least some (e.g., the cellular module 221) of the other elements of the electronic device 201. The processor 210 loads a command or data received from at least one of other elements (e.g., a non-volatile memory) into a volatile memory and processes the command or data and stores various data in the non-volatile memory.

The communication module 220 may have a configuration that is the same as or similar to the communication module 170 illustrated in FIG. 1. The communication module 220 may include the cellular module 221, a WiFi module 223, a BT module 225, a GNSS module (e.g., a GPS module, a Glonass module, Beidou module, or a Galileo module) 227, a NFC module 228, and a radio frequency (RF) module 229.

The cellular module 221 provides a voice call, a video call, a text service, or an Internet service over a communication network. The cellular module 221 identifies and authenticates the electronic device 201 in a communication network by using the SIM 224. The cellular module 221 may perform at least one of the functions that may be provided by the processor 210. The cellular module 221 includes a communication processor (CP).

At least one of the WiFi module 223, the BT module 225, the GNSS module 227, and the NFC module 228 may include a processor for processing data transmitted and received by a corresponding module. At least some (e.g., two or more) of the cellular module 221, the WiFi module 223, the BT module 225, the GNSS module 227, and the NFC module 228 may be included in one Integrated Chip (IC) or IC package.

The RF module 229 transmits or receives a communication signal (e.g., an RF signal). The RF module 229 may include a transceiver, a power amplifier module (PAM), a frequency filter, a low noise amplifier (LNA), or an antenna. At least one of the cellular module 221, the WiFi module 223, the BT module 225, the GNSS module 227, and the NFC module 228 transmits and receives an RF signal through a separate RF module.

The SIM 224 is a card including an SIM and/or an embedded SIM, and includes unique identification information (e.g., an integrated circuit card identifier (ICCID) or subscriber information (e.g., an international mobile subscriber identity (IMSI)).

The memory 230 (e.g., the memory 130 of FIG. 1) may include an internal memory 232 or an external memory 234.

The internal memory 232 may include at least one of a volatile memory (e.g., dynamic random access memory (DRAM), static RAM (SRAM), synchronous dynamic RAM (SDRAM), and a non-volatile memory (e.g., one time programmable read only memory (OTPROM), programmable ROM (PROM), erasable and programmable ROM (EPROM), electrically erasable and programmable ROM (EEPROM), mask ROM, flash ROM, NAND flash memory, or NOR flash memory), and a solid state drive (SSD).

The external memory 234 may include flash drive, for example, compact flash (CF), secure digital (SD), micro-SD, mini-SD, extreme Digital (xD), a multimedia card (MMC), or a memory stick. The external memory 234 may be functionally and/or physically connected with the electronic device 1801 through various interfaces.

The sensor module 240 measures a physical quantity or detects an operation state of the electronic device 201 to convert the measured or detected information into an electric signal. The sensor module 240 may include at least one of a gesture sensor 240A, a gyro sensor 240B, a pressure sensor 240C, a magnetic sensor 240D, an acceleration sensor 240E, a grip sensor 240F, a proximity sensor 240G, a red, green, and blue (RGB) sensor 240H, a biometric sensor 240I, a temperature/humidity sensor 240J, an illumination sensor 240K, and a ultraviolet (UV) sensor 240M. Additionally or alternatively, the sensor module 1840 may include an e-nose sensor, an electromyography (EMG) sensor, an electroencephalogram (EEG) sensor, an electrocardiogram (ECG) sensor, or a fingerprint sensor. The sensor module 240 may further include a control circuit for controlling at least one sensor included therein. The electronic device 201 may further include a processor configured to control the sensor module 240 as part of or separately from the processor 210, during a sleep state of the processor 210.

The input device 250 may include a touch panel 252, a (digital) pen sensor 254, a key 256, or an ultrasonic input device 258.

The touch panel 252 may use at least one of a capacitive type, a resistive type, an IR type, or an ultrasonic type. The touch panel 252 may further include a control circuit. The touch panel 252 may further include a tactile layer to provide tactile reaction to the user.

The (digital) pen sensor 254 may include a recognition sheet which is a part of the touch panel 252 or a separate recognition sheet.

The key 256 may also include a physical button, an optical key, or a keypad.

The ultrasonic input device 258 detects ultrasonic waves, generated in an input means for generating the ultrasonic waves, through the microphone 288 and checks data corresponding to the detected ultrasonic waves in the electronic device 201.

The display 260 (e.g., the display 160 of FIG. 1) may include a panel 262, a hologram device 264, or a projector 266.

The panel 262 may have a configuration that is the same as or similar to that of the display 160 of FIG. 1. The panel 262 may be implemented to be flexible, transparent, or wearable. The panel 262 may be configured with the touch panel 252 in one module.

The hologram device 264 shows a stereoscopic image in the air by using interference of light.

The projector 266 displays an image onto a screen through projection of light. The screen may be positioned inside or outside the electronic device 201.

The display 260 may further include a control circuit for controlling the panel 262, the hologram device 264, or the projector 266.

The display 160 including the panel 262 may be the same as or similar to that of a touch screen. That is, the touch screen may be defined as including the display 160 for displaying particular information and the panel 262 capable of receiving a touch input.

The interface 270 may include a high-definition multimedia interface (HDMI) 272, a universal serial bus (USB) 274, an optical communication 276, or a D-subminiature 278. The interface 270 may be included in the communication module 170 illustrated in FIG. 1. Additionally or alternatively, the interface 270 may include a Mobile High-Definition Link (MHL) interface, an SD/MMC interface, or an infrared data association (IrDA) interface.

The audio module 280 bi-directionally converts sound and an electric signal. At least one element of the audio module 280 may be included in the I/O interface 150 illustrated in FIG. 1. The audio module 280 processes sound information input or output through a speaker 282, a receiver 284, an earphone 286, or the microphone 288.

The camera module 291 is a device capable of capturing a still image or a moving image, may include one or more image sensors (e.g., a front sensor or a rear sensor), a lens, an image signal processor (ISP), or a flash (e.g., an LED or a xenon lamp).

The power management module 295 manages power of the electronic device 201. The power management module 295 may include a Power management integrated circuit (PMIC), a charger IC, or a battery gauge. The PMIC may have a wired and/or wireless charging scheme. The wireless charging scheme may include a magnetic-resonance type, a magnetic induction type, and an electromagnetic type, and for wireless charging, an additional circuit, for example, a coil loop, a resonance circuit, or a rectifier may be further included. The battery gauge measures the remaining capacity, voltage, current, or temperature during charging of the battery 296.

The battery 296 may include a rechargeable battery and/or a solar battery.

The indicator 297 displays a particular state, for example, a booting state, a message state, or a charging state, of the electronic device 201 or a part thereof (e.g., the AP 210).

The motor 298 converts an electric signal into a mechanical vibration or generates a vibration or a haptic effect. The electronic device 201 may include a processing device (e.g., a GPU) for supporting a mobile TV. The processing device for supporting the mobile TV processes media data according to a standard, such as digital multimedia broadcasting (DMB), digital video broadcasting (DVB), or mediaFlo™.

According to an embodiment of the present disclosure, each of the foregoing elements may include one or more components, and a name of the part may vary with a type of the electronic device 201. The electronic device 201 may include at least one of the foregoing elements, and some of the elements may be omitted therefrom or other elements may be further included therein. As some of the elements of the electronic device 201 are coupled into one entity, the same function may performed as those of the individual.

Figure 3:
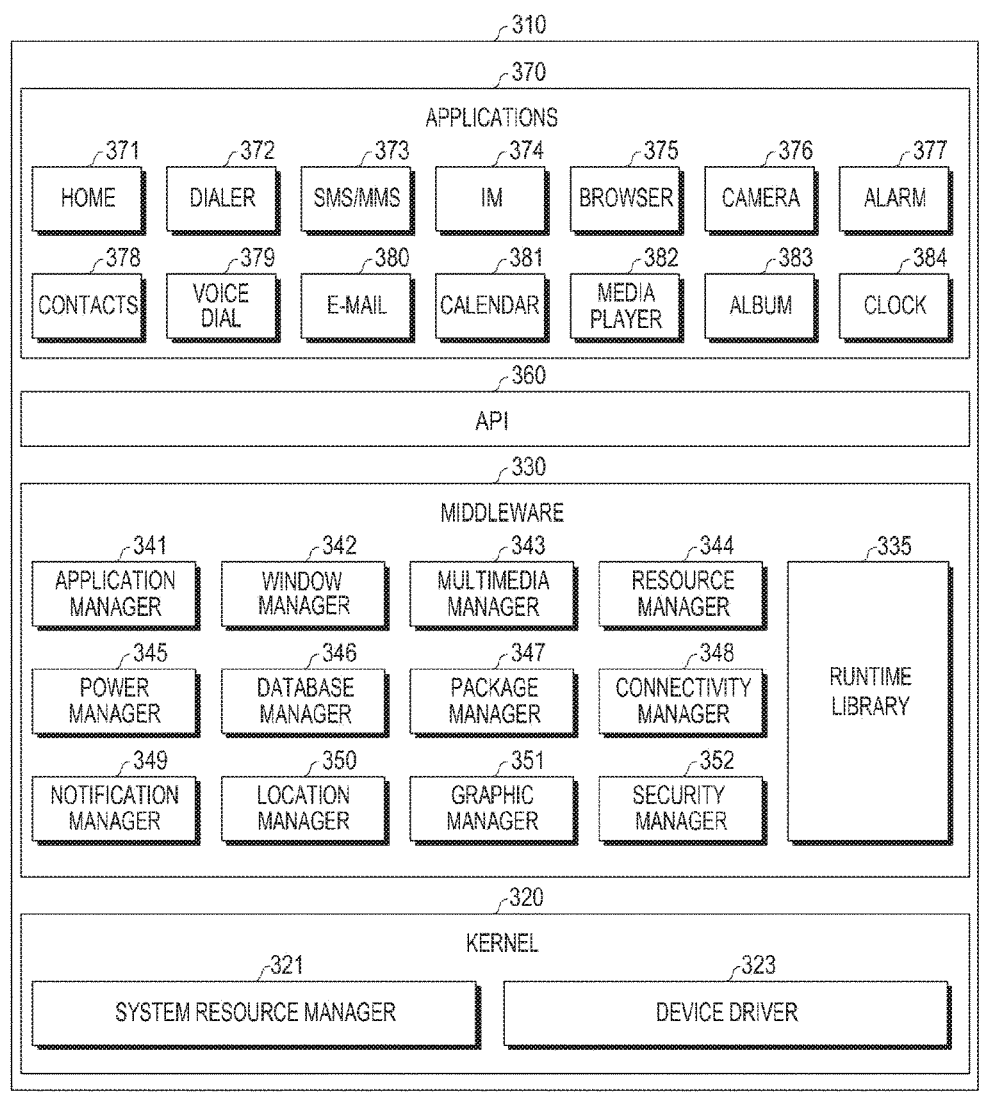
FIG. 3 is a block diagram of a configuration of a program module, according to an embodiment of the present disclosure.

FIG. 3 is a block diagram of a configuration of a program module, according to an embodiment of the present disclosure.

Referring to FIG. 3, a programming module 310 is provided. The programming module 310 (e.g., the program 140 of FIG. 1.) may include an OS for controlling resources associated with the electronic device 101 and/or various applications executed on the OS. The OS may include Android, iOS, Windows, Symbian, Tizen, or Bada.

The programming module 310 includes a kernel 320, a middleware 330, an application programming interface (API) 360, and/or applications 370. At least a part of the programming module 310 may be preloaded on the electronic device 101 or may be downloaded from the external electronic device 102 or 104, or the server 106.

The kernel 320 (e.g., the kernel 141 of FIG. 1) includes a system resource manager 321 and/or a device driver 323.

The system resource manager 321 performs control, allocation, or retrieval of system resources. The system resource manager 321 may include a process management unit, a memory management unit, or a file system.

The device driver 323 may include, for example, a display driver, a camera driver, a Bluetooth driver, a shared memory driver, a USB driver, a keypad driver, a WiFi driver, an audio driver, or an inter-process communication (IPC) driver.

The middleware 330 may include functions commonly required by the applications 370 or provides various functions to the applications 370 through the API 360 to allow the applications 370 to efficiently use a limited system resource in an electronic device 101. The middleware 330 (e.g., the middleware 143 of FIG. 1) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 is a library module that a compiler uses to add a new function through a programming language while at least one of the applications 370 is executed. The runtime library 335 performs functions relating to an I/O, memory management, or calculation operation.

The application manager 341 manages a life cycle of at least one application among the applications 370.

The window manager 342 manages a GUI resource using a screen.

The multimedia manager 343 recognizes a format necessary for playing various media files and performs encoding or decoding on a media file by using a codec appropriate for a corresponding format.

The resource manager 344 manages a resource such as source code, memory, or storage space of at least one application among the applications 370.

The power manager 345 manages a battery or power in operation with a basic input/output system (BIOS) and provides power information necessary for an operation of the electronic device 101.

The database manager 346 performs a management operation to generate, search or change a database used for at least one application among the applications 370.

The package manager 347 manages the installation or update of an application distributed in a package file format.

The connectivity manager 348 manages a wireless connection such as a WiFi or Bluetooth connection.

The notification manager 349 displays or notifies of events, such as arrival messages, appointments, and proximity alerts, in a manner that is not disruptive to a user.

The location manager 350 manages location information of the electronic device 101.

The graphic manager 351 manages a graphic effect to be provided to a user or a user interface (UI) related thereto.

The security manager 352 provides a general security function necessary for system security or user authentication.

When the electronic device 101 has a call function, the middleware 330 may further include a telephony manager for managing a voice or video call function of the electronic device.

The middleware 330 includes a middleware module forming a combination of various functions of the above-mentioned internal elements. The middleware 330 provides modules specified according to types of OS so as to provide distinctive functions. Additionally, the middleware 330 may delete some of existing elements or add new elements dynamically.

The API 360 (e.g., the API 145 of FIG. 1) is a set of API programming functions with a different configuration according to the OS. In the case of Android or iOS one API set may be provided by each platform, and in the case of Tizen, two or more API sets may be provided.

The applications 370 (e.g., the application program 147 of FIG. 1) may include one or more applications capable of providing a function, for example, a home application 371, a dialer application 372, a short messaging service/multimedia messaging service (SMS/MMS) application 373, an instant message (IM) application 374, a browser application 375, a camera application 376, an alarm application 377, a contact application 378, a voice dial application 379, an e-mail application 380, a calendar application 381, a media player application 382, an album application 383, and a clock application 384. The applications 370, may additionally or alternatively include a health care application (e.g., an application for measuring an exercise amount or a blood sugar level), or an environment information providing application (e.g., an application for providing air pressure, humidity, or temperature information).

The applications 370 may include an information exchange application supporting information exchange between the electronic device 101 and the external electronic device 102 or 104. The information exchange application may include a notification relay application for transferring specific information to the external electronic device or a device management application for managing the external electronic device 102 or 104.

The notification relay application performs a function for transferring notification information generated in another application (e.g., an SMS/MMS application, an e-mail application, a health care application, or an environment information application) of the electronic device 101 to the external electronic device 102 or 104. The notification relay application may receive notification information from the external electronic device 102 or 104 to provide the same to a user.

The device management application manages (e.g., installs, removes, or updates) at least one function (e.g., turn on/turn off of an external electronic device itself (or a part thereof) or control of brightness (or resolution) of a display) of an external electronic device in communication with the electronic device 101, and a service provided by an application operating in the external electronic device or provided by the external electronic device (e.g., a call service or a message service).

The applications 370 may include an application (e.g., a health care application of mobile medical equipment) designated according to an attribute of the external electronic device 102 or 104. The applications 370 may include an application received from the external electronic device 102 or 104 or the server 106. The applications 370 may include a preloaded application or a third party application that may be downloaded from the server 106. Names of elements of the programming module 310 may vary depending on a type of an OS.

At least a part of the programming module 310 may be implemented by software, firmware, hardware, or a combination thereof. At least a part of the programming module 310 may be implemented (e.g., executed) by a processor (e.g., the processor 210 of FIG. 2). At least a part of the programming module 310 may include a module, a program, a routine, sets of instructions, or a process for performing one or more functions.

Figure 4:
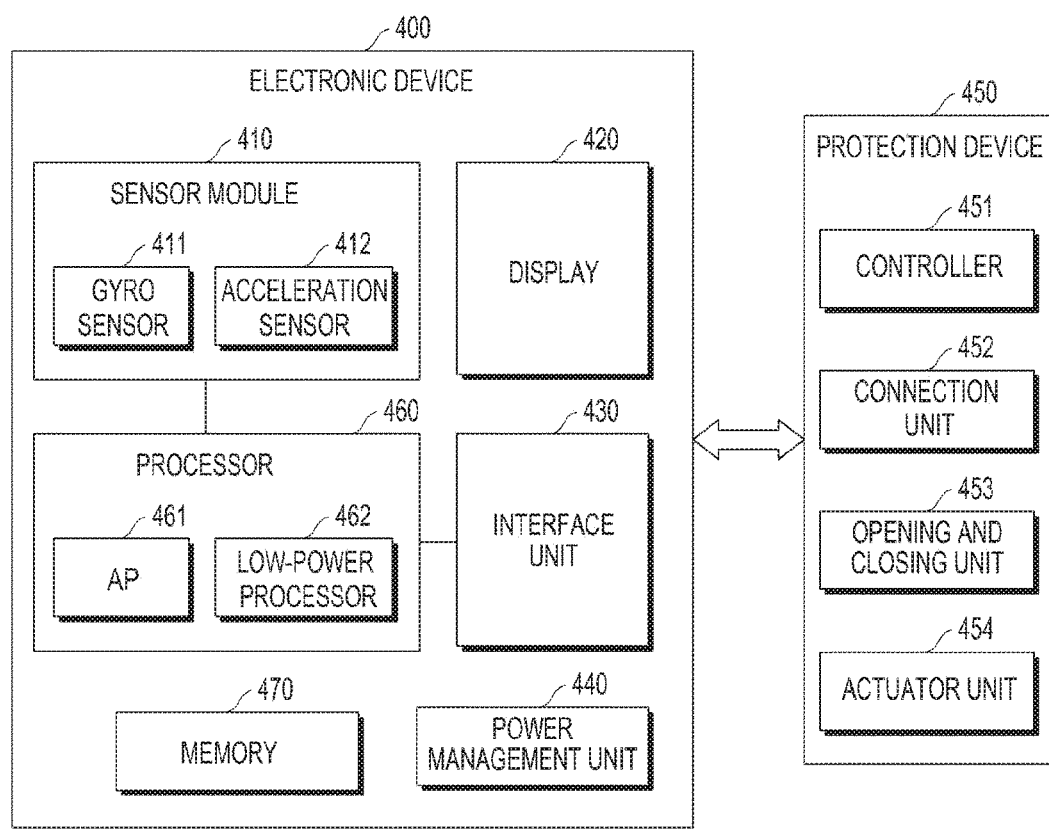
FIG. 4 is a block diagram of configurations of an electronic device and a protection device, according to an embodiment of the present disclosure.

FIG. 4 is a block diagram of configurations of an electronic device and a protection device, according to an embodiment of the present disclosure.

Referring to FIG. 4, an electronic device 400 and a protection (or cover) device 450 is provided. The electronic device 400 includes a sensor module 410, a display 420, an interface unit 430, a power management unit 440, a processor 460, and a memory 470.

The sensor module 410 includes one or more of a gyro sensor 411 and an acceleration sensor 412. The sensor module 410 detects a motion state of the electronic device 400. For example, the sensor module 410 may detect a speed change (an acceleration) and an orientation change of the electronic device 400.

The acceleration sensor 412 detects a change in a speed of the electronic device 400 at which the electronic device 400 moves along an x-axis, a y-axis, and a z-axis of an orthogonal coordinate system.

The gyro sensor 411 detects the amount of rotation of the electronic device 400 that rotates along the x-axis, the y-axis, and the z-axis of the orthogonal coordinate system.

The speed change or the amount of rotation of the electronic device 400 detected by the acceleration sensor 412 and the gyro sensor 411 may be transmitted to the processor 460. The processor 460 determines whether the electronic device 400 is dropped based on the motion state detected by the sensor module 410.

The sensor module 410 detects an orientation state of the display 420. For example, if the electronic device 400 is dropped, the sensor module 410 detects whether the orientation of the display 420 provided on a front surface of the electronic device 400 is the same as or opposite of a dropping direction. The processor 460 controls the protection device 450 based on the orientation of the display 420 detected by the sensor module 410 and the determination of whether the electronic device 400 is dropped.

The sensor module 410 detects an opening/closing state of the protection device 450 connected to the electronic device 400 through the interface unit 430. For example, the sensor module 410 may include one or more of a proximity sensor, an illumination sensor, and a magnetic sensor for detecting opening and closing of the protection device 450. For example, the illumination sensor may be disposed between the protection device 450 and the electronic device 400 to detect illumination between the protection device 450 and the electronic device 400. If the detected illumination is less than or equal to a preset illumination value, the processor 460 determines that the protection device 450 is closed. If the detected illumination is greater than the preset illumination value, the processor 460 determines that the protection device 450 is open. The proximity sensor may detect a proximate distance between the protection device 450 and the electronic device 400 and determine whether the protection device 450 is closed or open based on the detected proximate distance. The magnetic sensor may detect a strength of a magnetic force of a magnet included in the protection device 450, and the processor 460 compares the detected strength of the magnetic force with a preset magnetic force strength and determines based on a comparison result whether the protection device 450 is closed or open.

The display 420 displays a specific image corresponding to a control command of the processor 460. The display 420 is included on a surface of the electronic device 400.

The interface unit 430 determines whether the protection device 450 is connected to the electronic device 400.

The power management unit 440 supplies power to each module in the electronic device 400.

The processor 460 includes an AP 461 and a low power processor (LPP) 462.

The AP 461 controls input and output of the electronic device 400, and manages modules in the electronic device 400. Generally, any module in the electronic device 400 may be controlled by the AP 461, and power consumption corresponding to control by the AP 461 exceeds power consumption corresponding to an operation of the LPP 462. For example, if a use stop command with respect to the AP 461 is received from a user, an operation of the AP 461 may be stopped to minimize power consumption of the AP 461 and an operation of the LPP 462 set to control some sensor modules of the electronic device 400 may be initiated.

The memory 470 stores various programs necessary for an operation of the API 461 or logs detecting data necessary for opening and closing the protection device 450 for the LPP 462. The memory 470 loads or stores program-related system parameters for monitoring the dropping of the electronic device 400.

The protection device 450 includes a controller 451, a connection unit 452, an opening and closing unit 453, and an actuator unit 454. The connection unit 452 connects the electronic device 400 with the protection device 450.

The opening and closing unit 453 covers the front surface of the electronic device 400 when closed. For example, when the opening and closing unit 453 overlaps the front surface of the electronic device 400 in such a way to cover the front surface of the electronic device 400, the opening and closing unit 453 protects the display 410 provided on the front surface of the electronic device 400 from an external shock.

The controller 451 controls all modules in the protection device 450 based on a control signal sent from the electronic device 400. For example, upon receiving an opening and closing command with respect to the opening and closing unit 453 from the electronic device 400 through the connection unit 452, the controller 451 closes the opening and closing unit 453 such that the opening and closing unit 453 covers the display 410 of the electronic device 400. Upon receiving an opening and closing command with respect to the opening and closing unit 453, the controller 451 may close the opening and closing unit 453 by using the actuator 454 such that the opening and closing unit 453 covers the display 410 of the electronic device 400.

The actuator 454 may include a motor for closing the opening and closing unit 453 by applying a rotation force to the opening and closing unit 453; a magnet for closing the opening and closing unit 453 by using an electromagnetic force based on magnetism; and a shape memory material that is deformed by an electric force based on an external electric signal to close the opening and closing unit 453.

Figure 5A:
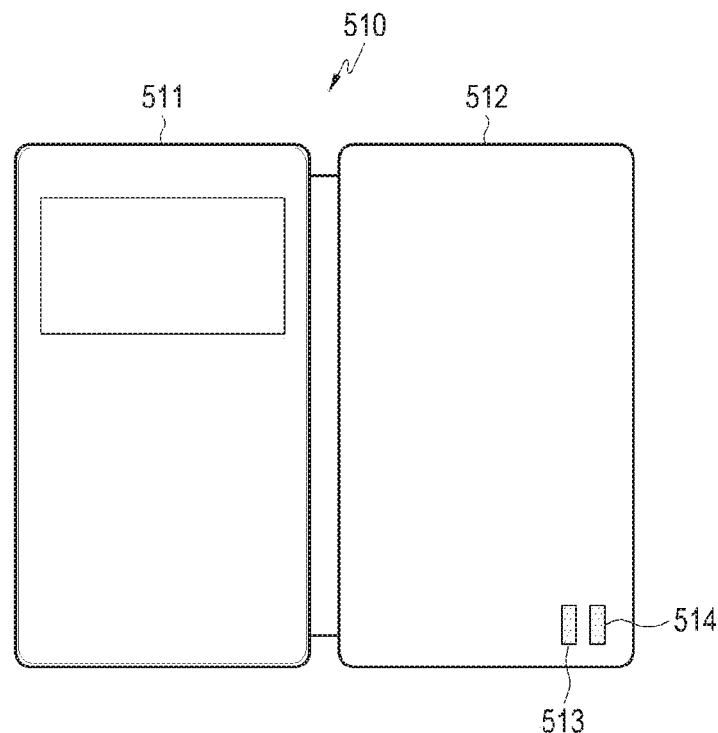
FIGS. 5A and 5B illustrate a recognition structure of a protection device, according to an embodiment of the present disclosure.
Figure 5B:
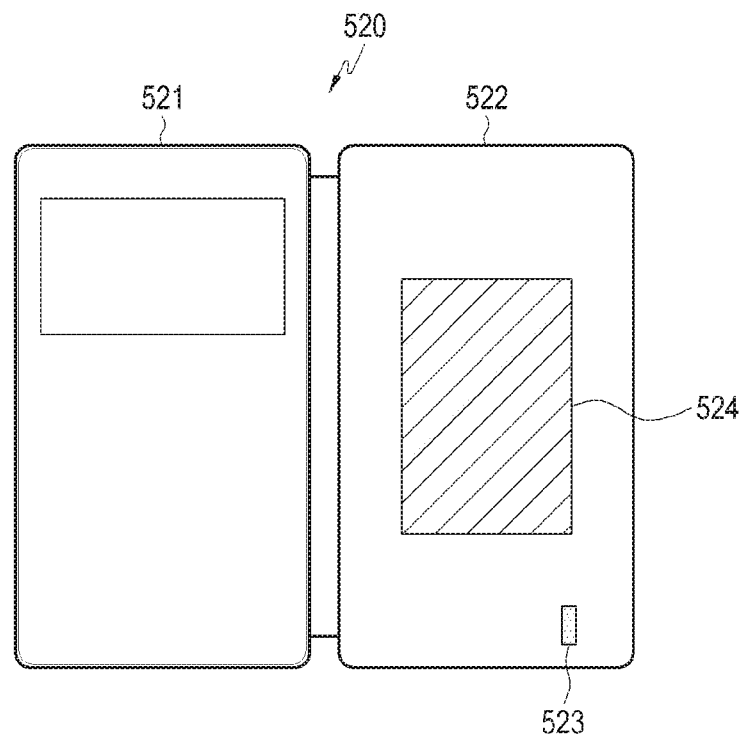

FIGS. 5A and 5B illustrate a recognition structure of a protection device, according to an embodiment of the present disclosure.

Referring to FIG. 5A, a protection device 510 includes an opening and closing unit 511 and a connection unit 512. To connect the protection device 510 to the electronic device 400, the connection unit 512 includes a detection pin 513 for detecting whether the electronic device 400 and the protection device 510 are connected and an analog-to-digital converter (ADC) 514 capable of transmitting and receiving a small amount of data being less than or equal to a preset amount to and from the electronic device 400. The connection unit 512 in the protection device 510 detects a state of connection with the electronic device 400 through the detection pin 513 and receives a control signal including the small amount of data being less than or equal to the preset amount, transmitted from the electronic device 400, through the ADC 514.

Referring FIG. 5B, a protection device 520 includes an opening and closing unit 521 and a connection unit 522. For example, to connect the protection device 510 to the electronic device 400, a connection unit 522 includes a detection pin 523 for detecting connection between the electronic device 400 and the protection device 510, and an NFC module 524 capable of receiving and transmitting a large amount of data greater than a preset amount from and to the electronic device 400. The connection unit 522 in the protection device 520 may detect a state of connection with the electronic device 400 through the detection pin 523 and receive a control signal including the large amount of data being greater than the preset amount, transmitted from the electronic device 400, through the NFC module 524. The connection units 512 and 522 may detect wireless connection through an NFC tag as well as wired connection through the detection pins 513 and 523.

Figure 6A:
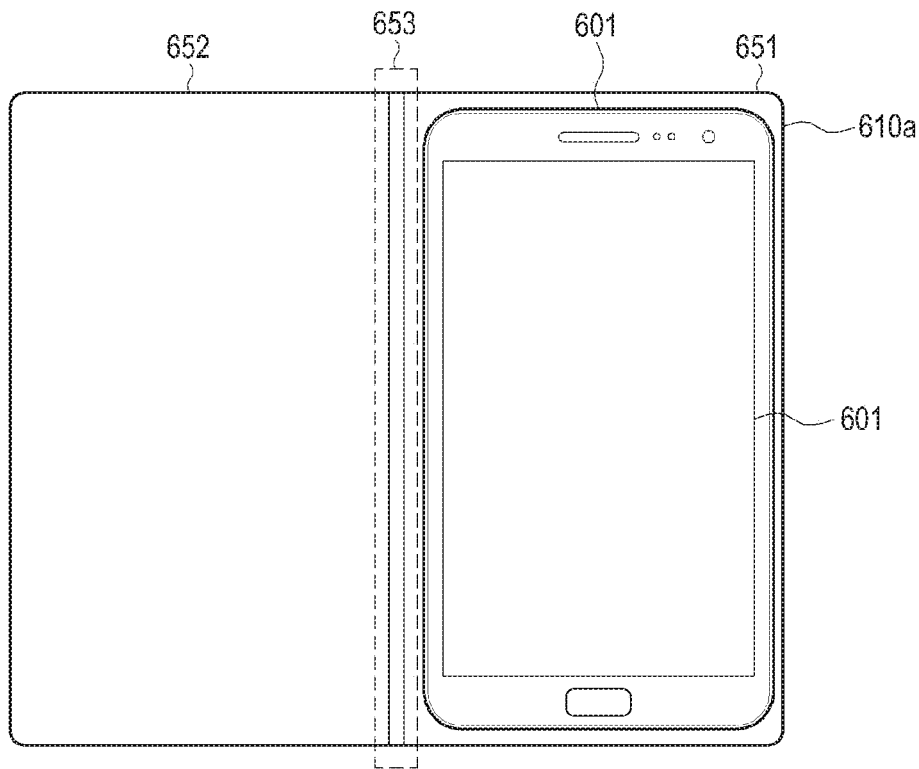
FIGS. 6A and 6B illustrate an electronic device and an exterior of a protection device connected to the electronic device, according to an embodiment of the present disclosure.
Figure 6B:
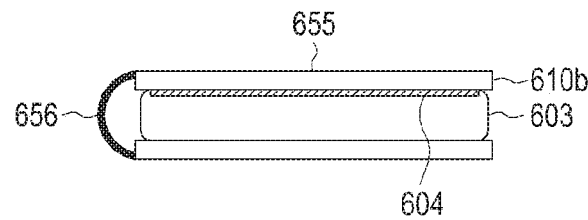

FIGS. 6A and 6B illustrate an electronic device and an exterior of a protection device connected to the electronic device, according to an embodiment of the present disclosure.

Referring to FIG. 6A, an electronic device 601 and a protection device 610a are provided. The electronic device 601 includes a display 602 provided on a front surface thereof. The protection device 610a includes a connection unit 651, an opening and closing unit 652, and an actuator 653. The controller 451 may be included in a particular module of the protection device 610a.

The electronic device 601 is connected with the protection device 610a through the connection unit 651.

Referring to FIG. 6B, a protection device 610b is connected to an electronic device 603. An opening and closing unit 655 of the protection device 610b covers a display 604 provided on a front surface of the electronic device 603, and an actuator 656 of a protection device 610b drives an opening and closing unit 655 of the protective device 629 to cover the display 604 depending on a control signal received from the electronic device 603.

Figure 7:
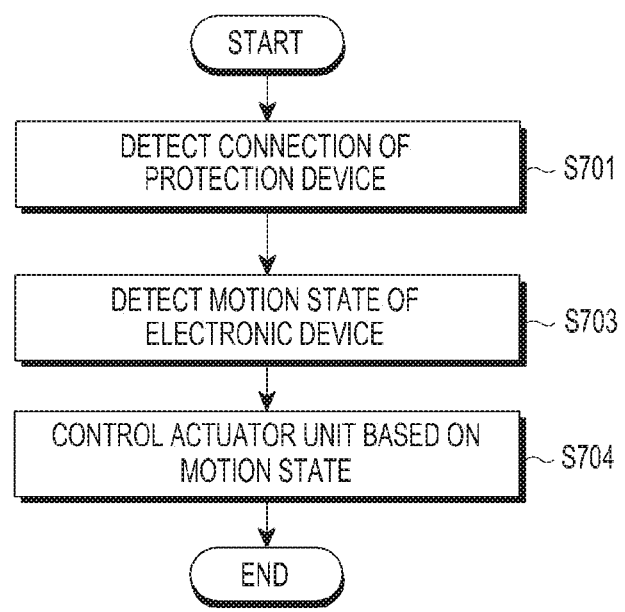
FIG. 7 is a flowchart of a method for protecting an electronic device, according to an embodiment of the present disclosure.

FIG. 7 is a flowchart of a method for protecting an electronic device, according to an embodiment of the present disclosure.

Referring to FIG. 7, in step S701, the electronic device 603 detects connection of the protection device 610b to the electronic device 603.

In step S703, once the protection device 610b is connected, the electronic device 603 detects a motion state thereof. For example, the electronic device 603 may detect a motion state of the electronic device 603 through the sensor module 410 provided in the electronic device 603 and determine whether the electronic device 603 is dropped based on the detected motion state.

In step S704, the electronic device 603 controls the actuator 656 based on the detected motion state. The electronic device 603 controls the actuator 656 based on the motion state thereof to open and close the protection device 610b. The electronic device 603 controls the actuator 656 to open and close the opening and closing unit 655 of the protection device 610b. For example, if determining based on the motion state of the electronic device 603 that the electronic device 603 is being currently dropped, the electronic device 603 controls the actuator 656 to open and close the opening and closing unit 655 of the protection device 610b connected to the electronic device 603. For example, if determining that the electronic device 603 is currently dropped and the opening and closing unit 655 is open, then the electronic device 603 closes the opening and closing unit 655 by using the actuator 656 to protect a display 604.

Figure 8A:
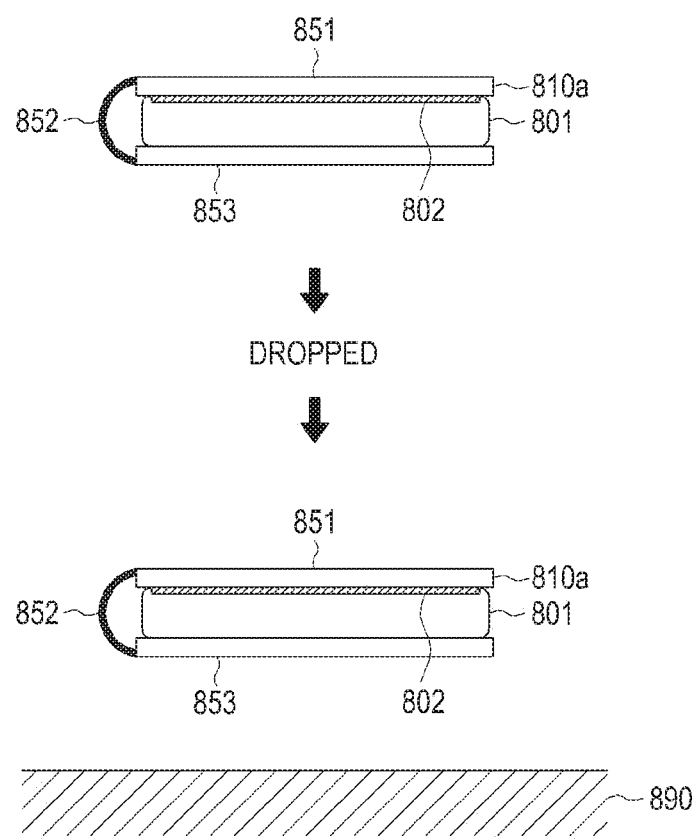
FIG. 8A illustrates a method for protecting an electronic device, including a display, when the electronic device is dropped, according to an embodiment of the present disclosure.

FIG. 8A illustrates a method for protecting an electronic device, including a display, when the electronic device is dropped, according to an embodiment of the present disclosure.

Referring to FIG. 8A, an electronic device 801 is connected with a protection device 810a. The electronic device 801 obtains a motion state of the electronic device 801 detected by the sensor module 410, open and closed states of an opening and closing unit 851 of the prover device 810a connected to the electronic device 801, or an orientation state of a display 802 of the electronic device 801. The electronic device 801 determines based on the obtained motion state, open and closed states, and orientation state whether the electronic device 801 is dropped, whether the opening and closing unit 851 is open or closed, or the orientation of the display 802, and opens and closes the opening and closing unit 851 through an actuator 852 based on the determination.

If it is determined that the electronic device 801 is dropped when the opening and closing unit 851 is closed on the display 802 of the electronic device 801, the electronic device 801 sends an open and closed state maintaining signal for maintaining the closed state of the opening and closing unit 851 to the protection device 810a through a connection unit 853. Upon receiving the open and closed state maintaining signal through the connection unit 853, the protection device 810a controls the actuator 852 to maintain the closed state of the opening and closing unit 851.

Accordingly, the electronic device 801 may be connected with a protection cover 810a that includes the actuator 852 formed of a material reacting to an electric signal. The actuator 852 provides a function of opening and closing the opening and closing unit 851 flexibly and maintains the shape of the actuator 852 according to an electric signal generated from the electronic device 801 or the protective cover 810a upon the occurrence of a drop event.

Figure 8B:
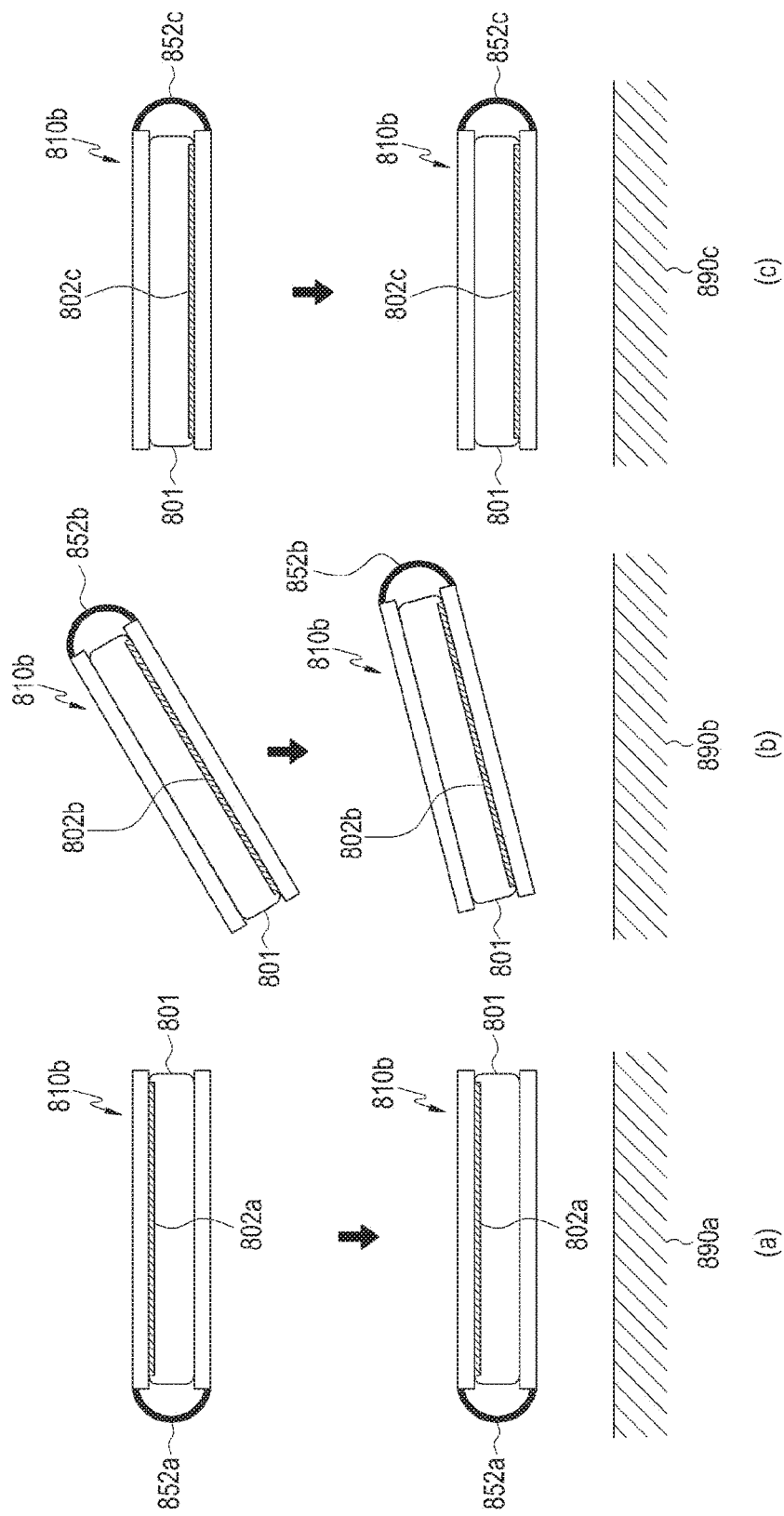
FIG. 8B illustrates a method for protecting an electronic device connected with a protection device, when the electronic device is dropped with an opening/closing unit of the protection device closed, according to an embodiment of the present disclosure.

FIG. 8B illustrates a method for protecting an electronic device connected with a protection device, when the electronic device is dropped with an opening/closing unit of the protective device closed, according to an embodiment of the present disclosure.

Referring to FIG. 8B, the electronic device 801 is connected with the protection device 810b having an opening/closing unit 851 in a closed state.

As shown in (a) of FIG. 8B, if it is determined that the opening/closing unit 851 is closed when a display 802a is oriented in a direction opposite of a dropping direction in which the display 802a is oriented toward the ground 890a, the electronic device 801 controls an actuator 852a of the protection device 810b to maintain the closed state of the opening/closing unit 851.

As shown in (b) of FIG. 8B, if it is determined that the opening/closing unit 851 is closed when a display 802b is oriented in a direction of 90° or less with respect to a dropping direction, in which the display 802b is oriented toward the ground 890b (hereinafter, the same direction as the dropping direction), the electronic device 801 controls an actuator 825b of the protection device 810b to maintain the closed state of the opening/closing unit 851.

As shown in (c) of FIG. 8B, if it is determined that the opening/closing unit 851 is closed when a display 802c is oriented in the same direction as a dropping direction, in which the display 802c is oriented toward the ground 890c, the electronic device 801 controls an actuator 825c of the protection device 810b to maintain the closed state of the opening/closing unit 851.

Figure 8C:
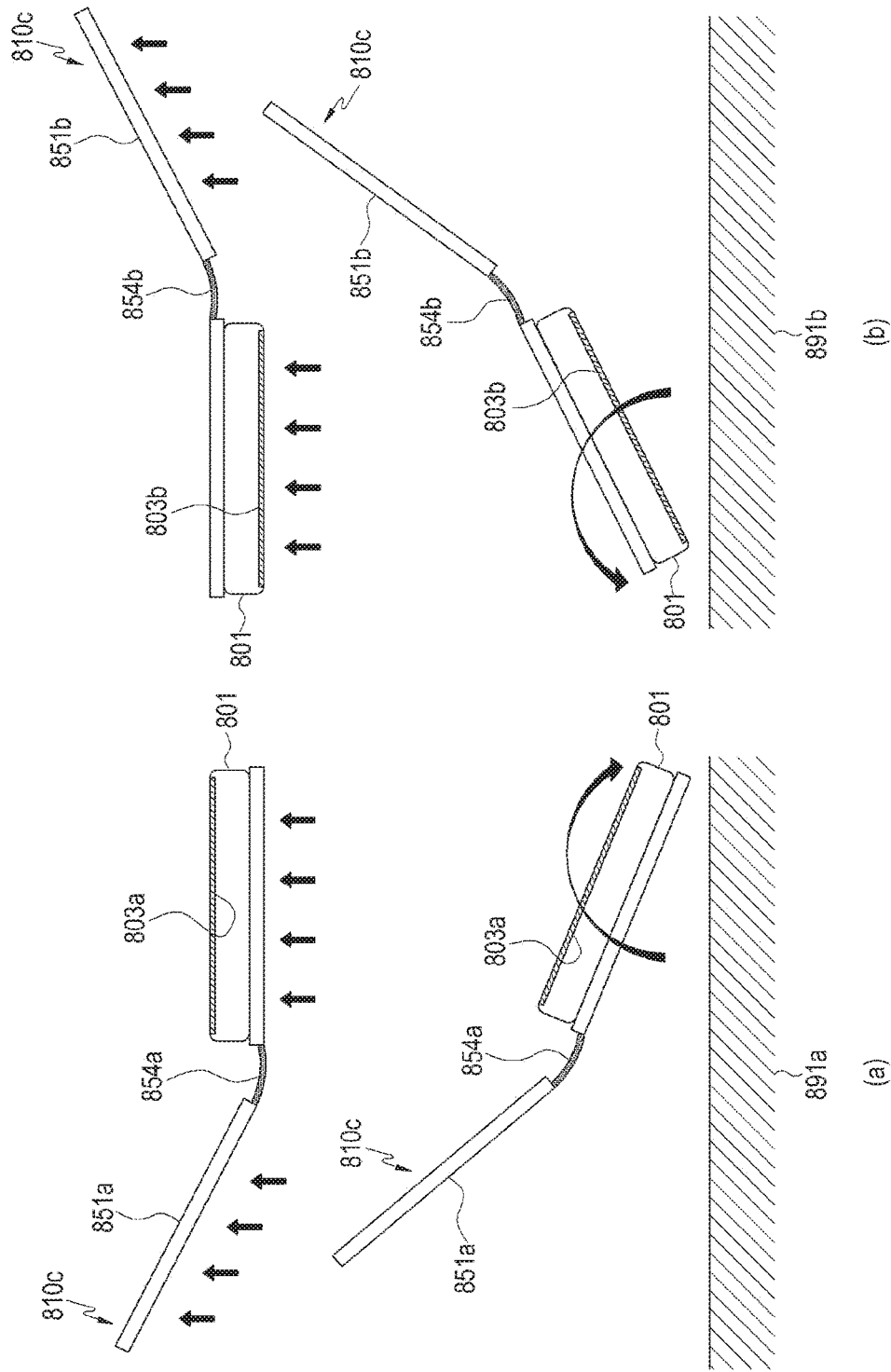
FIG. 8C illustrates a method for protecting an electronic device connected with a protection device, when the electronic device is dropped with an opening/closing unit of the protection device open, according to an embodiment of the present disclosure.

FIG. 8C illustrates a method for protecting an electronic device connected with a protection device, when the electronic device is dropped with an opening/closing unit of the protection device open, according to an embodiment of the present disclosure.

Referring FIG. 8C, the electronic device 801 is connected with the protection device 810c having an opening closing unit 851 in an open state.

As shown in (a) of FIG. 8C, if it is determined that the electronic device 801 is dropped when an orientation of a display 803a is opposite of a dropping direction toward the ground 891a and an opening and closing unit 851a is open, the electronic device 801 controls an actuator 854a to maintain the open state of the opening and closing unit 851a.

As shown in (b) of FIG. 8C, if it is determined that the electronic device 801 is dropped when the orientation of a display 803b is the same as a dropping direction toward the ground 891b and an opening and closing unit 851b is open, the electronic device 801 controls an actuator 854b to maintain the open state of the opening and closing unit 851b.

As shown in (a) and (b) of FIG. 8C, the opening and closing units 851 and 851b in the open state generate air resistance in a direction opposite of the directions toward the grounds 891*a* and 891*b*, thus changing a dropping posture of the electronic device 801 and protecting the displays 803*a* and 803*b* in such a way to prevent the displays 803*a* and 803*b* from coming in contact with the grounds 891*a* and 891*b*.

Figure 8D:
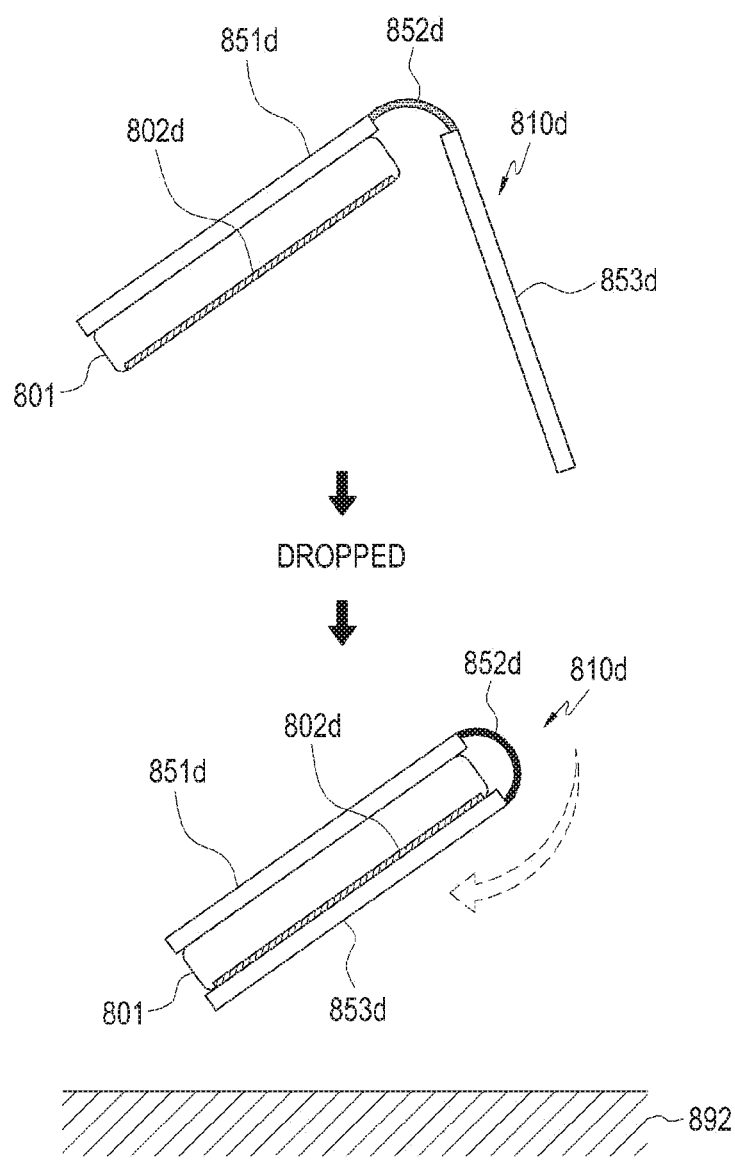
FIG. 8D illustrates a method for protecting an electronic device connection with a protection device, when the electronic device is dropped with an opening/closing unit of the protection device open and a display of the electronic device directed toward the ground, according to an embodiment of the present disclosure.

FIG. 8D illustrates a method for protecting an electronic device connection with a protection device, when the electronic device is dropped with an opening/closing unit of the protection device open and a display of the electronic device directed toward the ground, according to an embodiment of the present disclosure.

Referring to FIG. 8D, the electronic device 801 is connected with the protection device 810*d* through the connection unit 851*d*. When the electronic device 801 is dropped when a display 802*d* is oriented in the same direction as a dropping direction of the electronic device 801 toward the ground 892 and an opening and closing unit 853*d* of the protection device 810*d* is open, the electronic device 801 controls an actuator 852*d* to deform the opening and closing unit 853*d* from the open state to the close state.

Figure 9:
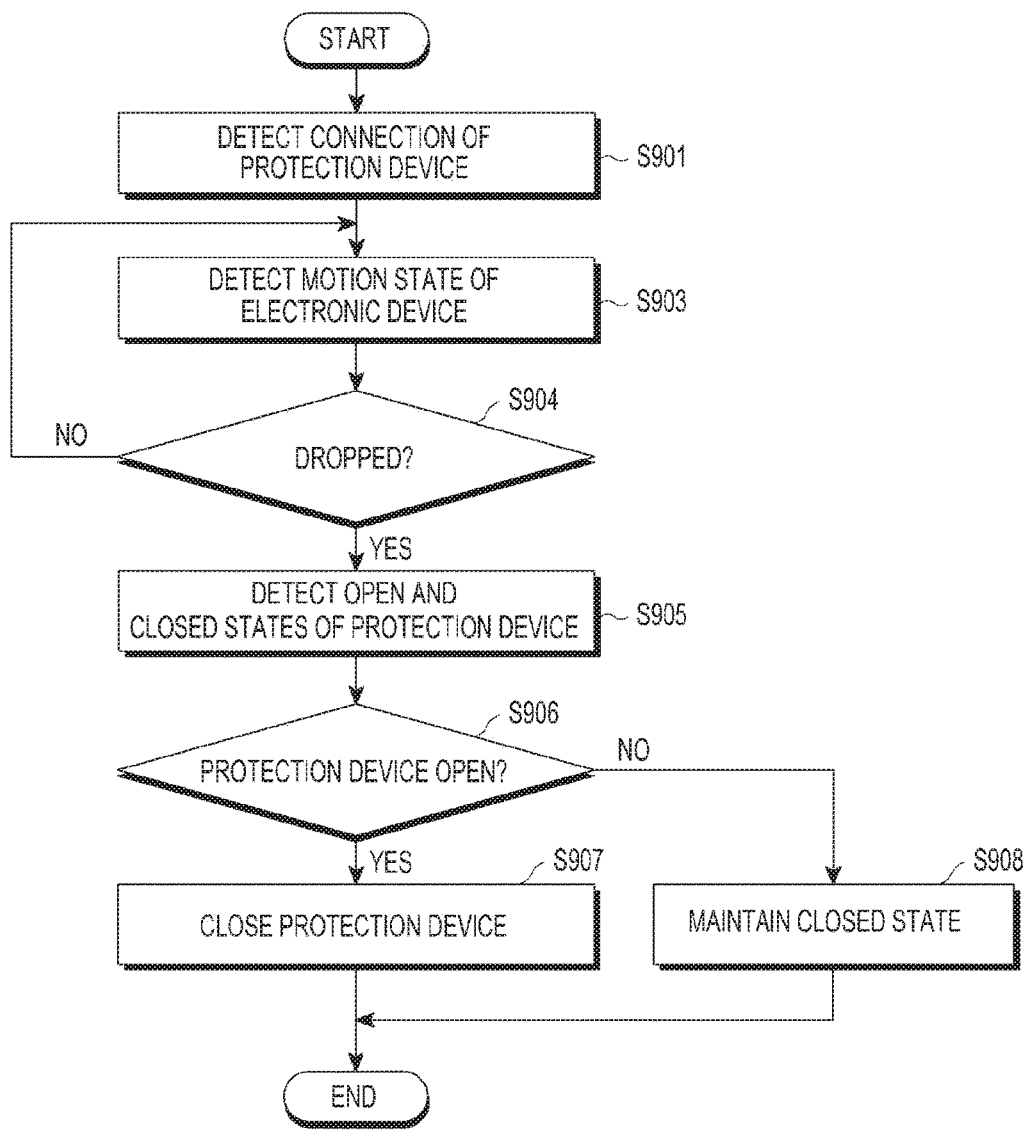
FIG. 9 is a flowchart of a method for protecting an electronic device, according to an embodiment of the present disclosure.

FIG. 9 is a flowchart of a method for protecting an electronic device, according to an embodiment of the present disclosure.

Referring to FIG. 9, in step S901, the electronic device 400 detects connection of the protection device 450 through the connection unit 452.

In step S903, once the protection device 450 is connected, the electronic device 400 detects a motion state of the electronic device 400 through the sensor module 410 in response to connection of the protection device 450.

In step S904, the electronic device 400 determines based on the motion state of the electronic device 400 whether the electronic device 400 is dropped.

In step S904, if it is determined that the electronic device 400 is not dropped, the electronic device 400 continues detecting the motion state of the electronic device 400.

If it is determined that the electronic device 400 is dropped in step S904, the electronic device 400 detects open and closed states of the opening and closing unit 453 of the protective device 450 in step S905.

In step S906, the electronic device 400 determines whether the opening and closing unit 453 is open.

If it is determined that the opening and closing unit 453 is open in step S906, the electronic device 400 closes the opening and closing unit 453 in step S907. For example, the electronic device 400 may open or close the opening and closing unit 453 through the actuator 454.

However, if it is determined that the opening and closing unit 453 is closed in step S908, the electronic device 400 controls the actuator 454 to maintain the closed state of the opening and closing unit 453 in step S908.

Figure 10A:
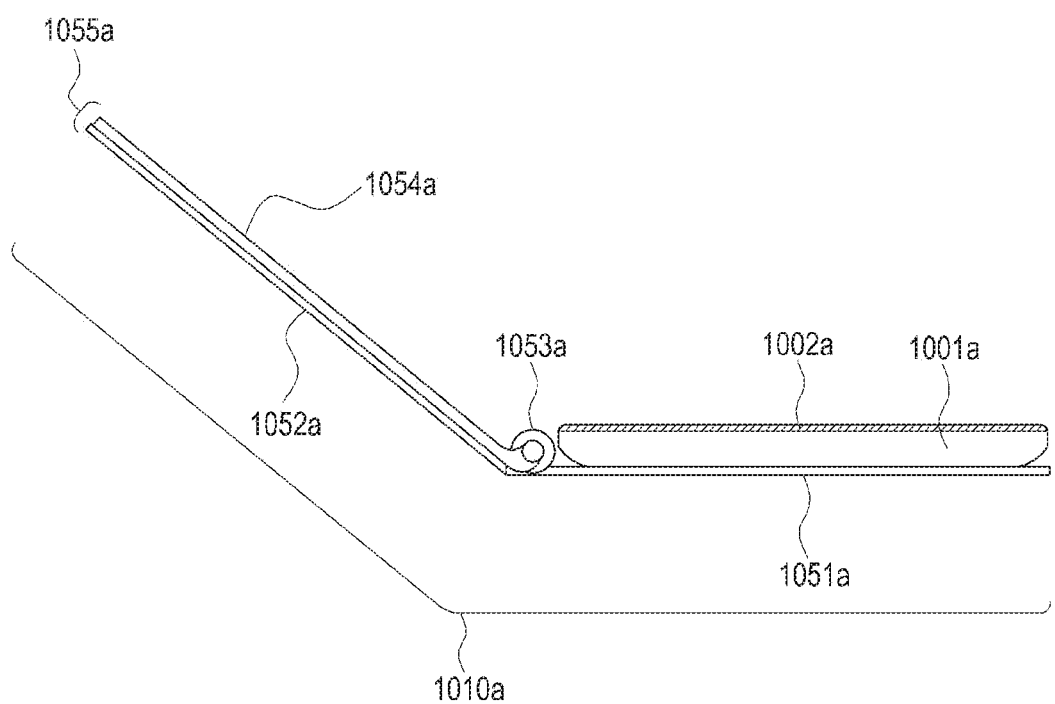
FIG. 10A illustrates an electronic device and a protection device, including a motor, for protecting the electronic device, according to an embodiment of the present disclosure.

FIG. 10A illustrates an electronic device and a protection device, including a motor, for protecting the electronic device, according to an embodiment of the present disclosure.

Referring to FIG. 10A, a protection device 1010*a* and an electronic device 1001*a* are provided. The protection device 1010*a* includes a connection unit 1051*a* for connection with the electronic device 1001*a*, an opening and closing unit 1055*a*, and a motor 1053*a* that is set to open and close the flip cover 1052*a* and the hinge arm 1054*a*. The opening and closing unit 1055*a* includes the flip cover 1052*a* and the hinge arm 1054*a*. The electronic device 1001*a* sends a signal for opening and closing the opening and closing unit 1055*a* to the motor 1053*a* based on whether the electronic device 1001*a* is dropped, the orientation of a display 1002*a*, and whether the opening and closing unit 1055*a* is open or closed. The motor 1053*a* is configured to rotate according to a signal for opening and closing the opening and closing unit 1055*a*, to pivot the hinge arm 1054*a* of the opening and closing unit 1055*a* along with the rotation, and thus to open or close the flip cover 1052*a*.

Figure 10B:
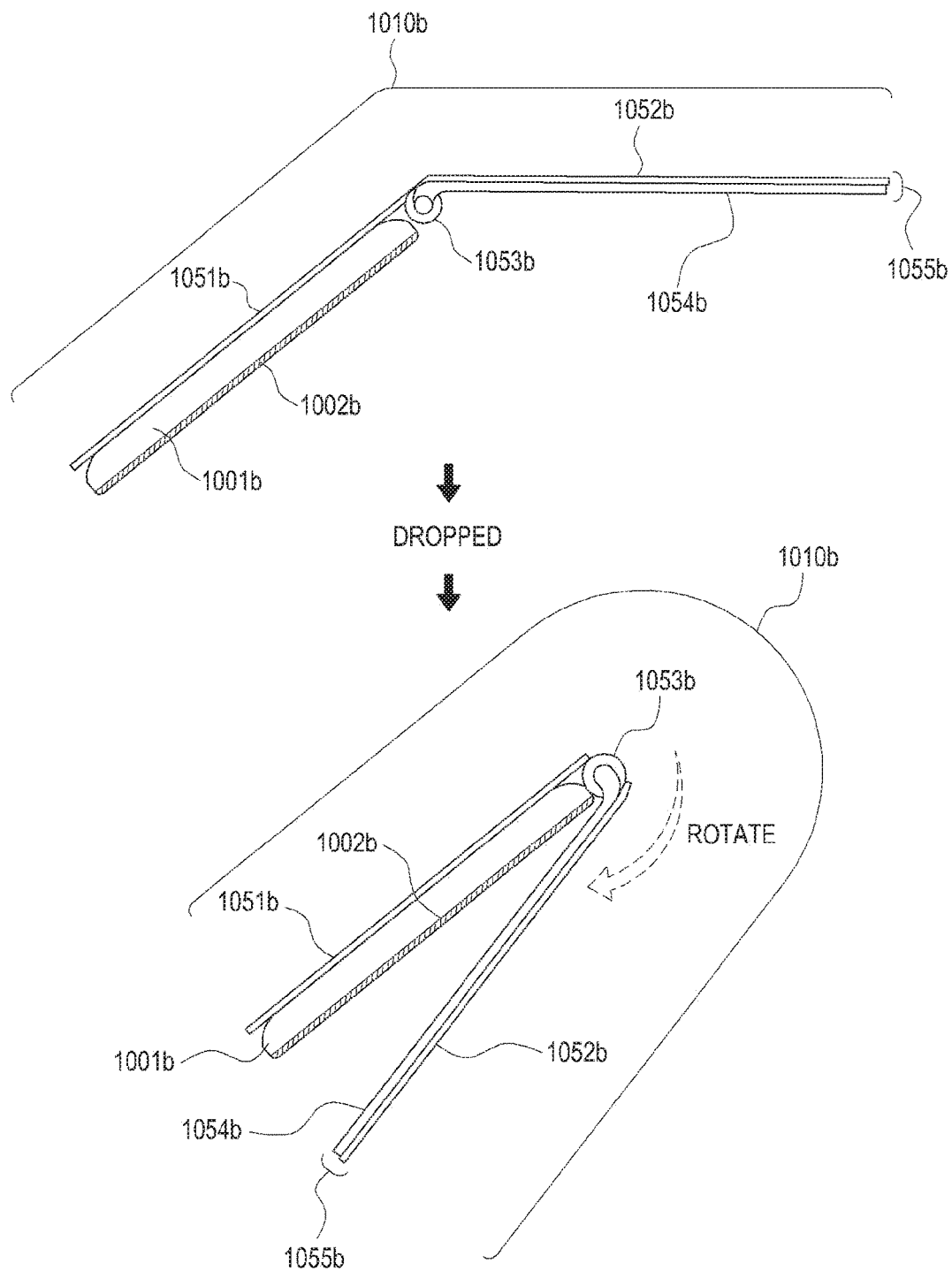
FIG. 10B illustrates an electronic device and a protection device, including a motor, for protecting the electronic device when the electronic device is dropped, according to an embodiment of the present disclosure.

FIG. 10B illustrates an electronic device and a protection device, including a motor, for protecting the electronic device when the electronic device is dropped, according to an embodiment of the present disclosure.

Referring to FIG. 10B, a protection device 1010*b* and an electronic device 1001*b* are provided. The protection device 1010*b* includes a connection unit 1051*b* for connection with the electronic device 1001*b*, an opening and closing unit 1055*b*, and a motor 1053*b* that is set to open and close the flip cover 1052*b* and the hinge arm 1054*b*. If it is determined that the electronic device 1001*b* is dropped when a display 1002*b* is oriented in the same direction as a dropping direction (in a direction of 90° or less with respect to the dropping direction) and the opening and closing unit 1055*b* is open, the electronic device 1001*b* sends a control signal for closing the opening and closing unit 1055*b* to the motor 1053*b* through the connection unit 1051*b*. As the motor 1053*b* rotates according to the received control signal, the hinge arm 1054*b* of the opening and closing unit 1055*b* also pivots toward the display 1002*b* and the flip cover 1052*b* and the hinge arm 1054*b* of the opening and closing unit 1055*b* are closed to cover the display 1002*b*.

Figure 11A:
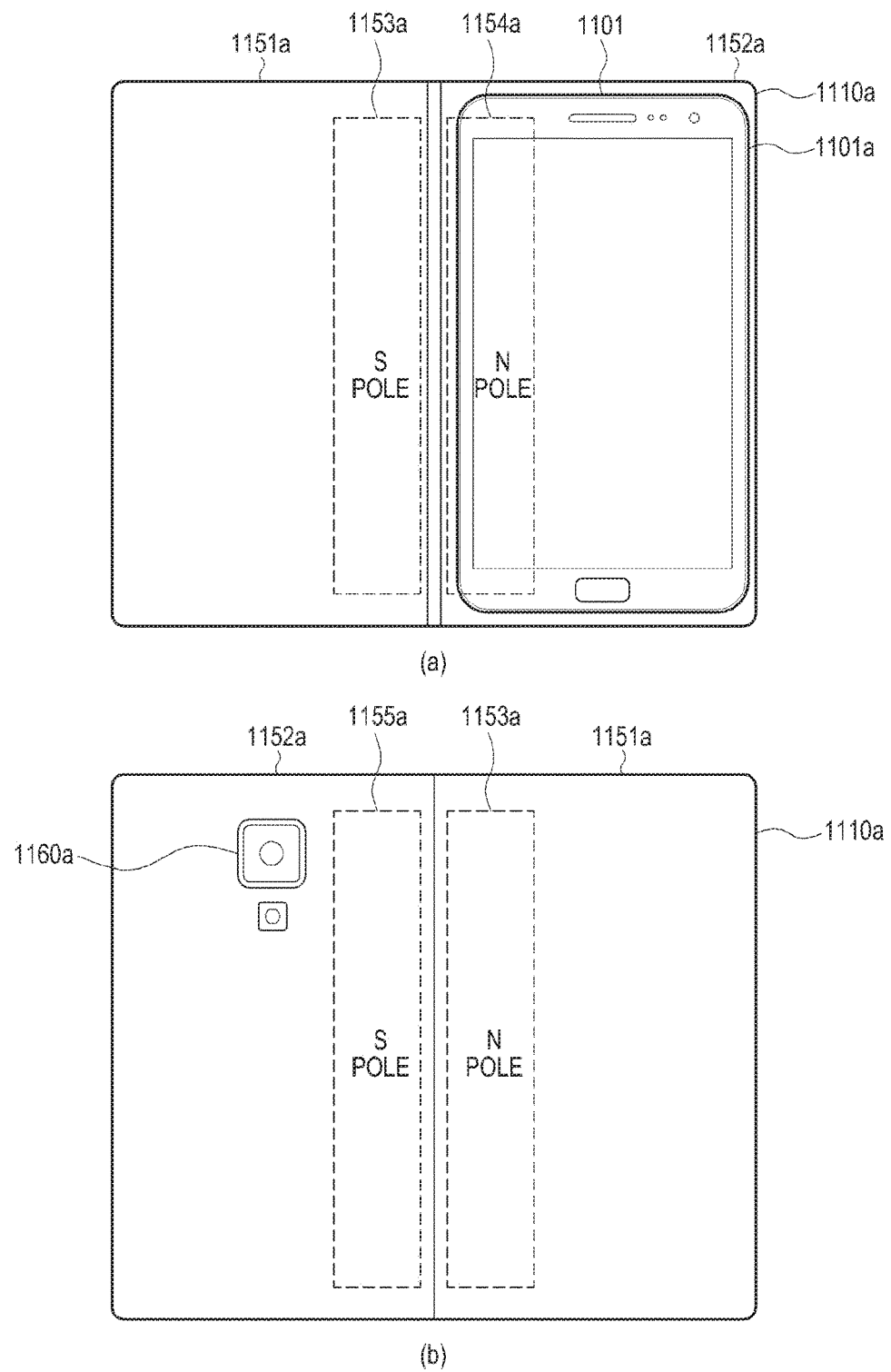
FIG. 11A illustrates a front surface and a rear surface of an electronic device and a protection device, including a magnet, for protecting the electronic device, according to an embodiment of the present disclosure.

FIG. 11A illustrates a front surface and a rear surface of an electronic device and a protection device, including a magnet, for protecting the electronic device, according to an embodiment of the present disclosure.

Referring to FIG. 11A, an electronic device 1101 is connected with a protection device 1110*a* through a connection unit 1152*a*.

A first magnet 1153*a* is included in a region of an opening and closing unit 1151*a* of the protection device 1110*a*. For example, the first magnet 1153*a* may be disposed such that an S pole of the first magnet 1153*a* is oriented toward a front surface of the opening and closing unit 1151*a* and an N pole of the first magnet 1153*a* is oriented toward a rear surface of the opening and closing unit 1151*a*.

A second magnet 1154*a* and a third magnet 1155*a* are included in a region of the connection unit 1152*a* of the protection device 1110*a*. For example, the second magnet 1154*a* and the third magnet 1155*a* may be disposed such that an N pole of the second magnet 1154*a* is oriented toward a rear surface of the connection unit 1152*a* and an N pole of the third magnet 1155*a* is oriented toward a front surface of the connection unit 1152*a*.

Figure 11B:
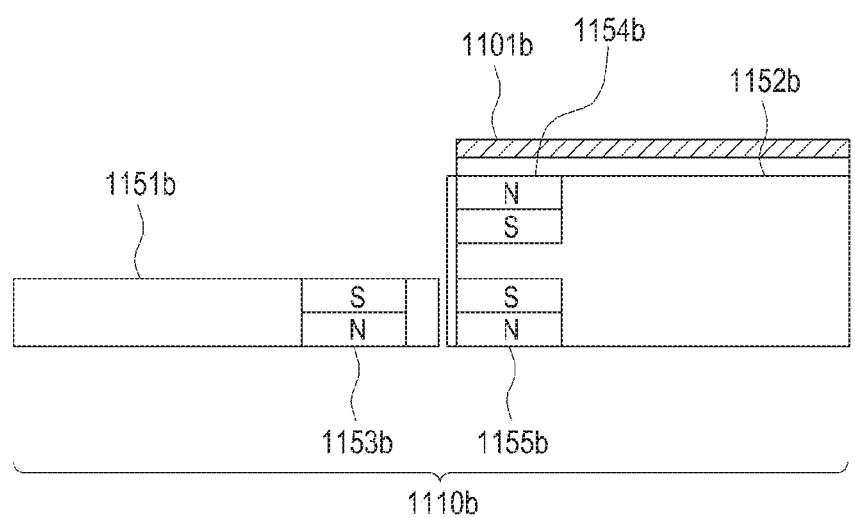
FIG. 11B illustrates a side surface of an electronic device and a protection device, including a magnet, for protecting the electronic device, according to an embodiment of the present disclosure.

FIG. 11B illustrates a side surface of an electronic device and a protection device, including a magnet, for protecting the electronic device, according to an embodiment of the present disclosure.

Referring to FIG. 11B, the electronic device 1101 is connected with a protection device 1110*b* through a connection unit 1152*b*. A first magnet 1153*b* is included in a region of an opening and closing unit 1151*b* of the protection device 1110*b*. A second magnet 1154*b* and a third magnet 1155*b* are included in a region of the connection unit 1152*b* of the protection device 1110*b*. S poles of the second magnet 1154*b* and the third magnet 1155*b* may be oriented toward the third magnet 1155*a* and the second magnet 1154*a*, respectively. For example, when the electronic device 1101*b* is dropped, upon application of an electric signal to the second magnet 1154*b* and the third magnet 1155*b*, an S pole of a first magnet 1153*b* and an N pole of the second magnet 1154b contact each other due to an electromagnetic force (attractive force), and an N pole of the first magnet 1153b and an N pole of the third magnet 1155b repulse each other due to an electromagnetic force (repulsive force), such that the opening and closing unit 1151b is closed onto a display 1101b of the electronic device 1101.

Figure 11C:
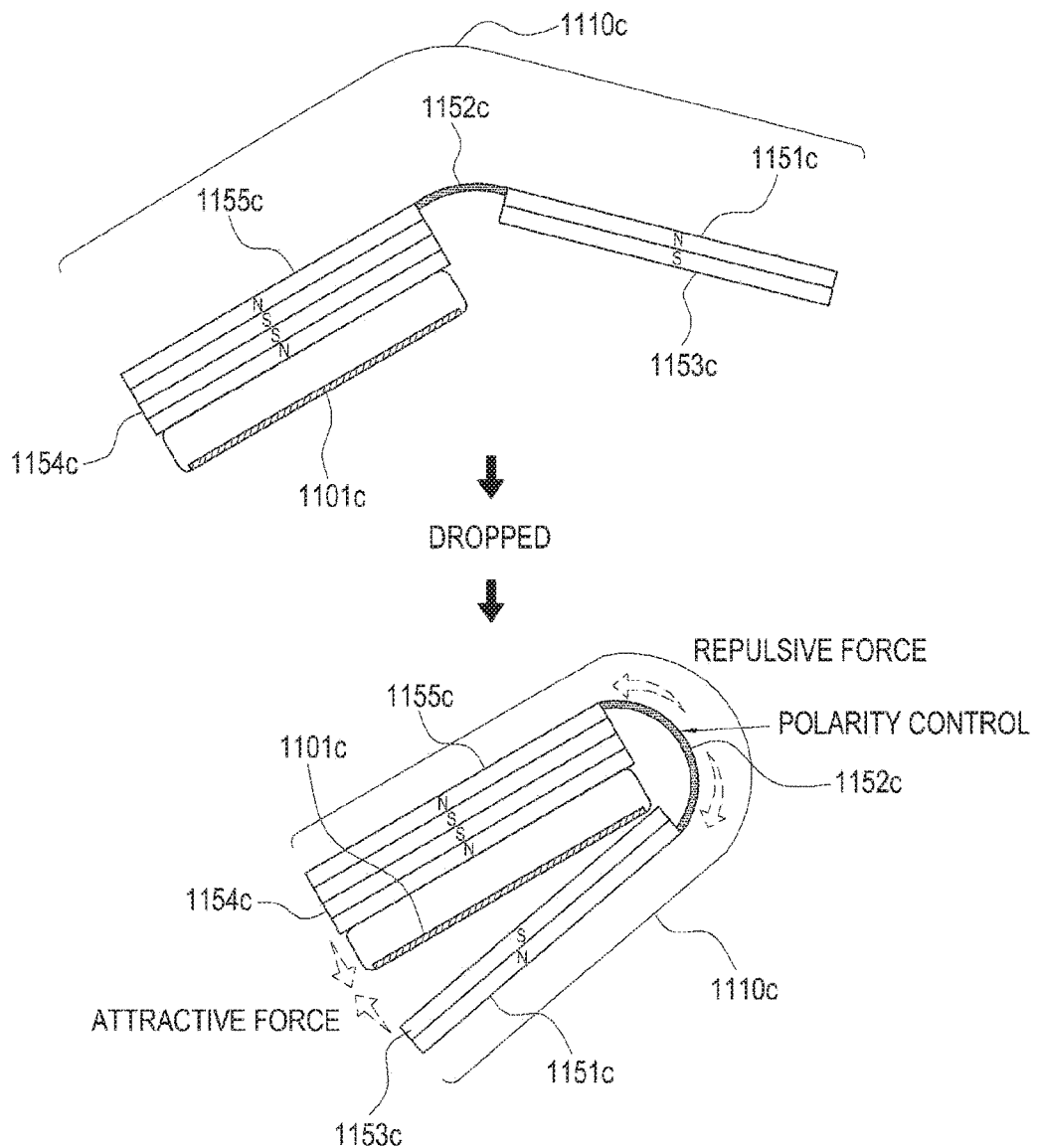
FIG. 11C illustrates an electronic device and a protection device, including a magnet, for protecting the electronic device when the electronic device is dropped, according to an embodiment of the present disclosure.

FIG. 11C illustrates an electronic device and a protection device, including a magnet, for protecting the electronic device when the electronic device is dropped, according to an embodiment of the present disclosure.

Referring to FIG. 11C, an electronic device 1101 is connected with a protection device 1110c through a connection unit 1152c. A first magnet 1153c is included in a region of an opening and closing unit 1151c of the protection device 1110c. A second magnet 1154c and a third magnet 1155c are included in a region of the connection unit 1152b of the protection device 1110b. If it is determined that the electronic device 1101 is dropped when a display 1101c of the electronic device 1101 is oriented in the same direction as a dropping direction (in a direction of 90° or less with respect to the dropping direction) and an opening and closing unit 1151c is open, then the electronic device 1101 applies an electric signal (a polarity control signal) to a second magnet 1154c and a third magnet 1155c in the connection unit 1152. Upon application of an electric signal (a polarity control signal) to the second magnet 1154c and the third magnet 1155c, an electromagnetic field is generated near the second magnet 1154c and the third magnet 1155c due to the electric signal applied to the second magnet 1154c and the third magnet 1155c, and due to the generated electric field, a repulsive force is induced between an N pole of the second magnet 1154c and an N pole of a first magnet 1153c which have the same polarity, and an attractive force is induced between an S pole of the first magnet 1153c and an N pole of the third magnet 1155c which have different polarities. With the induced repulsive force and attractive force, the opening and closing unit 1151c including the first magnet 1153c is closed to cover the display 1101c.

Figure 12A:
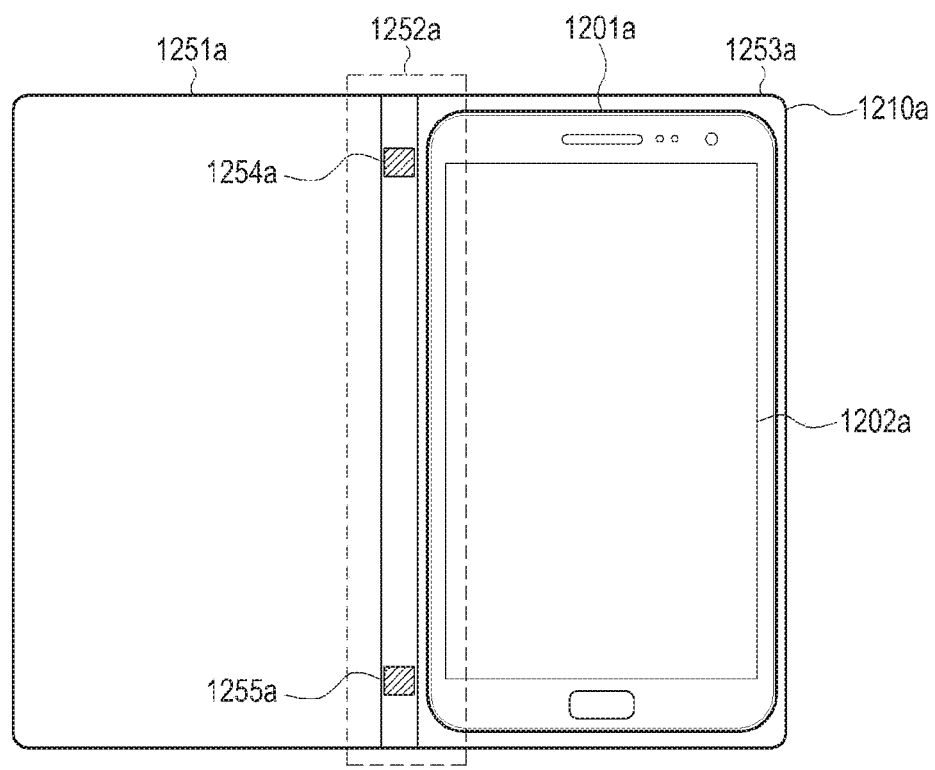
FIG. 12A illustrates a front surface of an electronic device and a protection device, including a shape memory material, for protecting the electronic device, according to an embodiment of the present disclosure.

FIG. 12A illustrates a front surface of an electronic device and a protection device, including a shape memory material, for protecting the electronic device, according to an embodiment of the present disclosure.

Referring to FIG. 12A, an electronic device 1201a is connected with a protective device 1210a. The protective device 1210a includes an opening and closing unit 1251a, an actuator 1252a, and a connection unit 1253a. In a region of the actuator 1252a between the connection unit 1253a, to which the electronic device 1201a is connected, and an opening and closing unit 1251a, shape memory materials 1254a and 1255a including an electro-active polymer material or an electro-physical polymer material may be applied. The shape memory materials 1254a and 1255a including the electro-active polymer material or the electro-physical polymer material may be deformed based on an electric signal received from the electronic device 1201a and may be deformed to protect an edge portion of a display 1202a based on the electric signal.

Figure 12B:
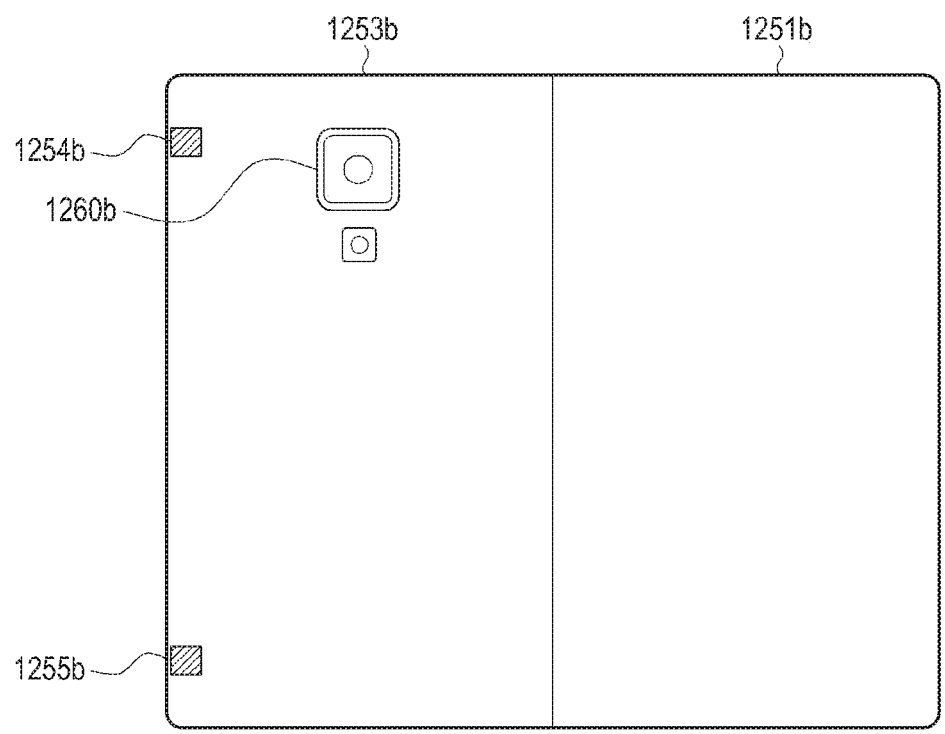
FIG. 12B illustrates a rear surface of an electronic device and a protection device, including a shape memory material, for protecting the electronic device, according to an embodiment of the present disclosure.

FIG. 12B illustrates a rear surface of an electronic device and a protection device, including a shape memory material, for protecting the electronic device, according to an embodiment of the present disclosure.

Referring to FIG. 12B the electronic device 1201a is connected with a protective device 1210b. The protective device 1210b includes an opening and closing unit 1251b, an actuator 1252b, a connection unit 1253b, and shape memory materials 1254b and 1255b. The shape memory materials 1254b and 1255b, including an electro-active polymer material or an electro-physical polymer material, may be applied in a region of an edge of the connection unit 1253b and may be deformed to protect an edge portion of the display 1202a of the electronic device 120a based on an electric signal.

The shape memory materials 1254a, 1255a, 1254b, and 1255b may be provided in an inner side or an outer side of the connection unit 1253b or the opening and closing unit 1251a and may be smaller in size than the connection unit 1253b or the opening and closing unit 1251a. A rotation radius of the shape memory materials 1254a, 1255a, 1254b, and 1255b may be smaller than that of the protection device 1210b, and the shape memory materials 1254a, 1255a, 1254b, and 1255b may be deformed to protect the edge portion of the display 1202a faster than the protection device 1210b during rotation. For example, when the shape memory materials 1254a, 1255a, 1254b, and 1255b are deformed, sizes of the shape memory materials 1254a, 1255a, 1254b, and 1255b may be greater than a first dimension that is a thickness of the electronic device 1201a to protect the edge portion of the display 1202a of the electronic device 1201a. Also, when the shape memory materials 1254a, 1255a, 1254b, and 1255b are deformed, the sizes of the shape memory materials 1254a, 1255a, 1254b, and 1255b may be greater than a first dimension that is a minimum dimension for protecting a front surface of the display 1202a to protect the front surface of the display 1202a of the electronic device 1201a.

Figure 12C:
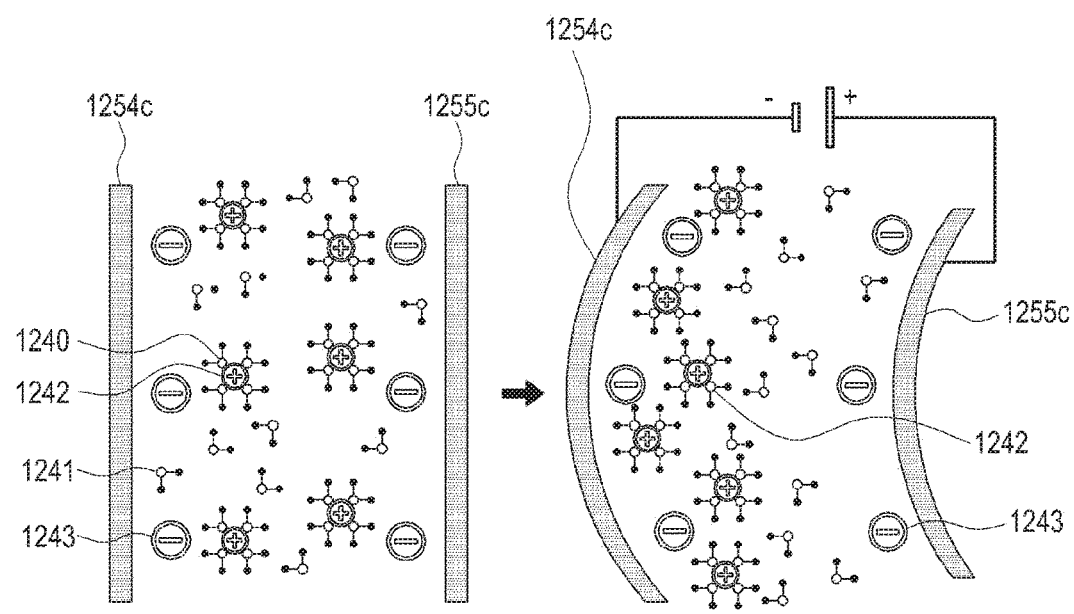
FIG. 12C illustrates the deformation, by an external electric stimulation, of a protection device, including a shape memory material, for protecting an electronic device, according to an embodiment of the present disclosure.

FIG. 12C illustrates the deformation, by an external electric stimulation, of a protection device, including a shape memory material, for protecting an electronic device, according to an embodiment of the present disclosure.

Referring to FIG. 12C, a protective device 1210c having a first shape memory material 1254c and a second shape memory material 1254c is provided. Upon application of a voltage to the first shape memory material 1254c and the second shape memory material 1255c, an electric field may be generated between the first shape memory material 1254c and the second shape memory material 1255c. Due to the electric field generated between the first shape memory material 1254c and the second shape memory material 1255c, negative ions 1243 existing between the first shape memory material 1254c and the second shape memory material 1255c may be fixed on inner side walls of the first shape memory material 1254c and the second shape memory material 1255c, and positive ions 1242 move toward the first shape memory material 1254c to which a negative voltage is applied, such that the first shape memory material 1254c and the second shape memory material 1255c may be deformed to be bent.

Figure 12D:
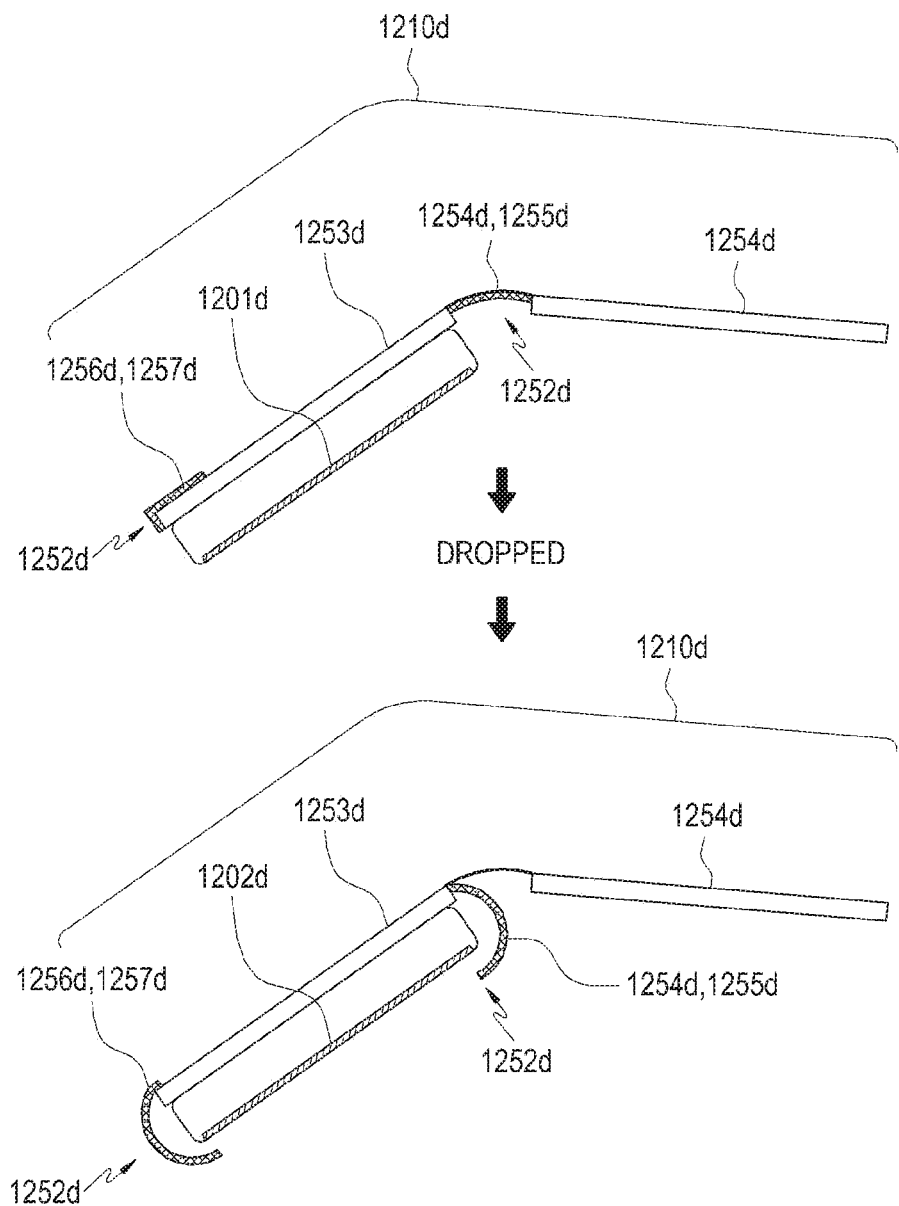
FIG. 12D illustrates an electronic device and a protection device, including a shape memory material, for protecting the electronic device when the electronic device is dropped, according to an embodiment of the present disclosure.

FIG. 12D illustrates an electronic device and a protection device, including a shape memory material, for protecting the electronic device when the electronic device is dropped.

Referring to FIG. 12D, an electronic device 1201d is connected with a protective device 1210d. The protective device 1210d includes an actuator 1252d, a connection unit 1253d, and an opening and closing unit 1254d. If it is determined that the electronic device 1201d is dropped when a display 1202d is oriented in the same direction as a dropping direction and the opening and closing unit 1254d is open, the electronic device 1201d applies a voltage to shape memory materials 1254d and 1255d included in an actuator 1252d and shape memory materials 1256d and 1257d included in the connection unit 1253d. Once a voltage is applied to each shape memory material, the shape memory materials 1256d and 1257d are deformed to enclose a left edge portion of the display 1202d.

The term "module", as used herein may refer to a unit including one of or a combination of hardware, software, and firmware. The term "module" may be interchangeably used with a unit, logic, a logical block, a component, or a circuit. The "module" may be a minimum unit or a portion of an integrated component. The "module" may be a minimum unit or a portion thereof performing one or more functions. The "module" may be implemented mechanically or electronically. For example, the "module" may include at least one of an application-specific integrated circuit (ASIC) chip, field-programmable gate arrays (FPGAs), and a programmable-logic device performing certain operations already known or to be developed.

According to embodiments of the present disclosure, at least a part of a device (for example, modules or functions thereof) or a method (for example, operations) may be implemented with a command stored in a computer-readable storage medium in the form of a program module. When the command is executed by a processor (for example, the processor 120), the one or more processors perform a function corresponding to the command. The computer-readable storage medium may be the memory 130.

The computer readable recording medium includes magnetic media, such as hard disk, floppy disk, or magnetic tape; optical media, such as compact disc read only memory (CD-ROM) or digital versatile disc (DVD); magneto-optical media, such as floptical disk; and a hardware device, such as ROM, RAM, flash memory, for storing and executing program commands. Further, the program instructions may include a machine language code created by a complier and a high-level language code executable by a computer using an interpreter. The foregoing hardware device may be configured to be operated as at least one software module to perform an operation of the present disclosure, or vice versa.

According to embodiments of the present disclosure, modules or programming modules may include one or more of the foregoing elements, have some of the foregoing elements omitted, or further include additional other elements. Operations performed by the modules, the programming modules or other elements may be executed in a sequential, parallel, repetitive or heuristic manner. Also, some of the operations may be executed in different order or omitted, or may have additional different operations.

The embodiments disclosed herein have been provided for description and understanding of disclosed technical matters, and are not intended to limit the scope of the present disclosure. Therefore, it should be construed that the scope of the present disclosure includes any change or other embodiments based on the technical spirit of the present disclosure. Therefore, the scope of the present disclosure is defined, not by the detailed description and embodiments, but by the following claims and their equivalents.

What is claimed is:

1. An electronic device comprising:
    a display;
    a sensor; and
    a processor configured to:
    receive, through the sensor, a motion state of the electronic device when a cover is connected to the electronic device, and
    control an actuator of the cover based on the motion state of the electronic device, and such that an opening and closing unit of the cover covers or uncovers the display.

2. The electronic device of claim 1, wherein the processor is configured to determine whether the electronic device is dropped based on the motion state and control the opening and closing unit of the cover to cover or uncover the display based on a result of the determination.

3. The electronic device of claim 2, wherein the sensor comprises a gyro sensor, and
    wherein the processor is configured to determine whether an amount of rotation of the electronic device is greater than a preset amount of rotation, and determine whether the electronic device is dropped based on a result of the determination of the amount of rotation.

4. The electronic device of claim 2, wherein the sensor comprises an acceleration sensor, and
    wherein the processor is configured to determine whether a speed change of the electronic device is greater than a preset acceleration, and determine whether the electronic device is dropped based on a result of the determination of the speed change.

5. The electronic device of claim 2, wherein the sensor detects an open and closed state of the cover, and
    wherein the processor is configured to determine whether the cover is open or closed based on the detected open and closed state, and control the opening and closing unit of the cover to cover or uncover the display based on a result of the determination of whether the cover is open or closed and whether the electronic device is dropped.

6. The electronic device of claim 5, wherein the sensor comprises one or more of a proximity sensor, an illumination sensor, and a magnetic sensor.

7. The electronic device of claim 5,
    wherein the sensor detects an orientation state of the display, and the processor is configured to control the opening and closing unit of the cover to cover or uncover the display based on the detected orientation state of the display, whether the cover is open or closed, and whether the electronic device is dropped.

8. The electronic device of claim 7, wherein the processor is configured to control the opening and closing unit of the cover to cover the display when it is determined that the electronic device is dropped and the display is oriented in a same direction as a dropping direction when the cover is open.

9. The electronic device of claim 7, wherein the processor is configured to maintain an open state of the cover when it is determined that the electronic device is dropped, the display is oriented in a same direction as a dropping direction, and the cover is open.

10. The electronic device of claim 7, wherein the processor is configured to maintain an open state of the cover when it is determined that the electronic device is dropped, the display is oriented in a direction opposite of a dropping direction, and the cover is open.

11. The electronic device of claim 7, wherein the processor is configured to maintain a closed state of the cover when it is determined that the electronic device is dropped and the cover is closed.

12. The electronic device of claim 1, wherein the processor comprises an application processor (AP) and a low power processor (LPP), and the LPP controls the opening and closing unit of the cover to cover or uncover the display when the AP is in a sleep mode.

13. A protection device for protecting an electronic device, the protection device comprising:
    a connection portion connected with the electronic device;
    an actuator configured to actuate the protection device;
    a controller configured to control the actuator based on a control signal obtained from the connected electronic device through the connection portion; and an opening and closing portion formed to cover and uncover a display of the electronic device when being open and closed, wherein the controller is configured to control the actuator to open or close the opening and closing portion.

14. The protection device of claim 13, wherein the connection portion comprises a near field communication (NFC) tag that sends a control signal obtained from the electronic device to the controller.

15. The protection device of claim 13, wherein the actuator comprises a motor configured to rotate according to control of opening and closing by the controller and opens and closes the opening and closing portion based on the rotation.

16. The protection device of claim 13, wherein the actuator comprises a shape memory material configured to be deformed based on an electric signal obtained from the electronic device and is deformed to open and close the opening and closing portion based on the electric signal.

17. The protection device of claim 16, wherein the shape memory material comprises an electro-active polymer material or an electro-physical polymer material.

18. A method for protecting an electronic device, the method comprising:
detecting connection of a cover to the electronic device;
detecting a motion state of the electronic device upon connection of the cover; and
controlling an actuator of the connected cover based on the detected motion state, and such that an opening and closing unit of the cover covers or uncovers a display of the electronic device.

* * * * *